US010594542B2

(12) United States Patent
Jeyakumar et al.

(10) Patent No.: US 10,594,542 B2
(45) Date of Patent: Mar. 17, 2020

(54) SYSTEM AND METHOD FOR NETWORK ROOT CAUSE ANALYSIS

(71) Applicant: Cisco Technology, Inc., San Jose, CA (US)

(72) Inventors: Vimal Jeyakumar, Los Altos, CA (US); Ali Parandehgheibi, Sunnyvale, CA (US); Andy Sloane, Pleasanton, CA (US); Ashutosh Kulshreshtha, Cupertino, CA (US); Navindra Yadav, Cupertino, CA (US); Omid Madani, San Carlos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 216 days.

(21) Appl. No.: 15/796,687

(22) Filed: Oct. 27, 2017

(65) Prior Publication Data
US 2019/0132190 A1 May 2, 2019

(51) Int. Cl.
H04L 12/24 (2006.01)
G06N 20/00 (2019.01)

(52) U.S. Cl.
CPC ......... H04L 41/0631 (2013.01); G06N 20/00 (2019.01); H04L 41/16 (2013.01); H04L 41/22 (2013.01)

(58) Field of Classification Search
CPC ..... H04L 41/0631; H04L 41/22; H04L 41/16; G06N 99/005
See application file for complete search history.

(56) References Cited

U.S. PATENT DOCUMENTS

| 5,086,385 A | 2/1992 | Launey et al. |
| 5,319,754 A | 6/1994 | Meinecke et al. |

(Continued)

FOREIGN PATENT DOCUMENTS

| CN | 101093452 | 12/2007 |
| CN | 101770551 | 7/2010 |

(Continued)

OTHER PUBLICATIONS

Al-Fuqaha, Ala, et al., "Internet of Things: A Survey on Enabling Technologies, Protocols, and Applications," IEEE Communication Surveys & Tutorials. vol. 17, No. 4, Nov. 18, 2015, pp. 2347-2376.

(Continued)

Primary Examiner — Brian J. Gillis
Assistant Examiner — Chhian (Amy) Ling
(74) Attorney, Agent, or Firm — Polsinelli PC

(57) ABSTRACT

Disclosed herein is a multi-level analysis for determining a root cause of a network problem by performing a first level of the multi-level process that includes collecting data from one or more network components, generating a set of system metrics where each system metric of the set representing a portion of the data, ranking the set of system metrics based on a level of correlation of each system metric to the network problem to yield a ranked set of system metrics, and providing a visual representation of the first level of the multi-level process. A second level of the multi-level process includes receiving an input identifying one or more of the ranked set of system metrics to be excluded from analysis and performing a conditional analysis using only ones of the set of system metrics that are not identified for exclusion.

20 Claims, 8 Drawing Sheets

(56) References Cited

U.S. PATENT DOCUMENTS

| | | |
|---|---|---|
| 5,400,246 A | 3/1995 | Wilson et al. |
| 5,436,909 A | 7/1995 | Dev et al. |
| 5,555,416 A | 9/1996 | Owens et al. |
| 5,726,644 A | 3/1998 | Jednacz et al. |
| 5,742,829 A | 4/1998 | Davis et al. |
| 5,822,731 A | 10/1998 | Schultz |
| 5,831,848 A | 11/1998 | Rielly et al. |
| 5,903,545 A | 5/1999 | Sabourin et al. |
| 6,012,096 A | 1/2000 | Link et al. |
| 6,141,595 A | 10/2000 | Gloudeman et al. |
| 6,144,962 A | 11/2000 | Weinberg et al. |
| 6,239,699 B1 | 5/2001 | Ronnen |
| 6,247,058 B1 | 6/2001 | Miller et al. |
| 6,249,241 B1 | 6/2001 | Jordan et al. |
| 6,330,562 B1 | 12/2001 | Boden et al. |
| 6,353,775 B1 | 3/2002 | Nichols |
| 6,525,658 B2 | 2/2003 | Streetman et al. |
| 6,546,420 B1 | 4/2003 | Lemler et al. |
| 6,597,663 B1 | 7/2003 | Rekhter |
| 6,611,896 B1 | 8/2003 | Mason, Jr. et al. |
| 6,654,750 B1 | 11/2003 | Adams et al. |
| 6,728,779 B1 | 4/2004 | Griffin et al. |
| 6,801,878 B1 | 10/2004 | Hintz et al. |
| 6,816,461 B1 | 11/2004 | Scrandis et al. |
| 6,847,993 B1 | 1/2005 | Novaes et al. |
| 6,848,106 B1 | 1/2005 | Hipp |
| 6,925,490 B1 | 8/2005 | Novaes et al. |
| 6,958,998 B2 | 10/2005 | Shorey |
| 6,983,323 B2 | 1/2006 | Cantrell et al. |
| 6,996,817 B2 | 2/2006 | Birum et al. |
| 6,999,452 B1 | 2/2006 | Drummond-Murray et al. |
| 7,002,464 B2 | 2/2006 | Bruemmer et al. |
| 7,024,468 B1 | 4/2006 | Meyer et al. |
| 7,096,368 B2 | 8/2006 | Kouznetsov et al. |
| 7,111,055 B2 | 9/2006 | Falkner |
| 7,120,934 B2 | 10/2006 | Ishikawa |
| 7,133,923 B2 | 11/2006 | MeLampy et al. |
| 7,162,643 B1 | 1/2007 | Sankaran et al. |
| 7,181,769 B1 | 2/2007 | Keanini et al. |
| 7,185,103 B1 | 2/2007 | Jain |
| 7,203,740 B1 | 4/2007 | Putzolu et al. |
| 7,302,487 B2 | 11/2007 | Ylonen et al. |
| 7,337,206 B1 | 2/2008 | Wen et al. |
| 7,349,761 B1 | 3/2008 | Cruse |
| 7,353,511 B1 | 4/2008 | Ziese |
| 7,356,679 B1 | 4/2008 | Le et al. |
| 7,360,072 B1 | 4/2008 | Soltis et al. |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,466,681 B2 | 12/2008 | Ashwood-Smith et al. |
| 7,467,205 B1 | 12/2008 | Dempster et al. |
| 7,496,040 B2 | 2/2009 | Seo |
| 7,496,575 B2 | 2/2009 | Buccella et al. |
| 7,530,105 B2 | 5/2009 | Gilbert et al. |
| 7,539,770 B2 | 5/2009 | Meier |
| 7,568,107 B1 | 7/2009 | Rathi et al. |
| 7,610,330 B1 | 10/2009 | Quinn et al. |
| 7,633,942 B2 | 12/2009 | Bearden et al. |
| 7,644,438 B1 | 1/2010 | Dash et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,743,242 B2 | 6/2010 | Oberhaus et al. |
| 7,752,307 B2 | 7/2010 | Takara |
| 7,774,498 B1 | 8/2010 | Kraemer et al. |
| 7,783,457 B2 | 8/2010 | Cunningham |
| 7,787,480 B1 | 8/2010 | Mehta et al. |
| 7,788,477 B1 | 8/2010 | Huang et al. |
| 7,808,897 B1 | 10/2010 | Mehta et al. |
| 7,813,822 B1 | 10/2010 | Hoffberg |
| 7,844,696 B2 | 11/2010 | Labovitz et al. |
| 7,844,744 B2 | 11/2010 | Abercrombie et al. |
| 7,864,707 B2 | 1/2011 | Dimitropoulos et al. |
| 7,873,025 B2 | 1/2011 | Patel et al. |
| 7,873,074 B1 | 1/2011 | Boland |
| 7,874,001 B2 | 1/2011 | Beck et al. |
| 7,885,197 B2 | 2/2011 | Metzler |
| 7,895,649 B1 | 2/2011 | Brook et al. |
| 7,904,420 B2 | 3/2011 | Ianni |
| 7,930,752 B2 | 4/2011 | Hertzog et al. |
| 7,934,248 B1 | 4/2011 | Yehuda et al. |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 8,001,610 B1 | 8/2011 | Chickering et al. |
| 8,005,935 B2 | 8/2011 | Pradhan et al. |
| 8,040,232 B2 | 10/2011 | Oh et al. |
| 8,040,822 B2 | 10/2011 | Proulx et al. |
| 8,056,134 B1 | 11/2011 | Ogilvie |
| 8,115,617 B2 | 2/2012 | Thubert et al. |
| 8,135,657 B2 | 3/2012 | Kapoor et al. |
| 8,156,430 B2 | 4/2012 | Newman |
| 8,160,063 B2 | 4/2012 | Maltz et al. |
| 8,179,809 B1 | 5/2012 | Eppstein et al. |
| 8,181,248 B2 | 5/2012 | Oh et al. |
| 8,185,824 B1 | 5/2012 | Mitchell et al. |
| 8,239,365 B2 | 8/2012 | Salman |
| 8,239,915 B1 | 8/2012 | Satish et al. |
| 8,250,657 B1 | 8/2012 | Nachenberg et al. |
| 8,255,972 B2 | 8/2012 | Azagury et al. |
| 8,266,697 B2 | 9/2012 | Coffman |
| 8,272,875 B1 | 9/2012 | Jurmain |
| 8,281,397 B2 | 10/2012 | Vaidyanathan et al. |
| 8,291,495 B1 | 10/2012 | Burns et al. |
| 8,296,847 B2 | 10/2012 | Mendonca et al. |
| 8,311,973 B1 | 11/2012 | Zadeh |
| 8,365,286 B2 | 1/2013 | Poston |
| 8,370,407 B1 | 2/2013 | Devarajan et al. |
| 8,381,289 B1 | 2/2013 | Pereira et al. |
| 8,391,270 B2 | 3/2013 | Van Der Stok et al. |
| 8,407,164 B2 | 3/2013 | Malik et al. |
| 8,407,798 B1 | 3/2013 | Lotem et al. |
| 8,413,235 B1 | 4/2013 | Chen et al. |
| 8,442,073 B2 | 5/2013 | Skubacz et al. |
| 8,451,731 B1 | 5/2013 | Lee et al. |
| 8,462,212 B1 | 6/2013 | Kundu et al. |
| 8,489,765 B2 | 7/2013 | Vasseur et al. |
| 8,499,348 B1 | 7/2013 | Rubin |
| 8,516,590 B1 | 8/2013 | Ranadive et al. |
| 8,527,977 B1 | 9/2013 | Cheng et al. |
| 8,549,635 B2 | 10/2013 | Muttik et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,572,739 B1 | 10/2013 | Cruz et al. |
| 8,588,081 B2 | 11/2013 | Salam et al. |
| 8,600,726 B1 | 12/2013 | Varshney et al. |
| 8,613,084 B2 | 12/2013 | Dalcher |
| 8,615,803 B2 | 12/2013 | Dacier et al. |
| 8,630,316 B2 | 1/2014 | Haba |
| 8,631,464 B2 | 1/2014 | Belakhdar et al. |
| 8,640,086 B2 | 1/2014 | Bonev et al. |
| 8,656,493 B2 | 2/2014 | Capalik |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,706,914 B2 | 4/2014 | Duchesneau |
| 8,713,676 B2 | 4/2014 | Pandrangi et al. |
| 8,719,452 B1 | 5/2014 | Ding et al. |
| 8,719,835 B2 | 5/2014 | Kanso et al. |
| 8,750,287 B2 | 6/2014 | Bui et al. |
| 8,752,042 B2 | 6/2014 | Ratica |
| 8,752,179 B2 | 6/2014 | Zaitsev |
| 8,755,396 B2 | 6/2014 | Sindhu et al. |
| 8,762,951 B1 | 6/2014 | Kosche et al. |
| 8,769,084 B2 | 7/2014 | Westerfeld et al. |
| 8,775,577 B1 | 7/2014 | Alford et al. |
| 8,776,180 B2 | 7/2014 | Kumar et al. |
| 8,812,448 B1 | 8/2014 | Anderson et al. |
| 8,812,725 B2 | 8/2014 | Kulkarni |
| 8,813,236 B1 | 8/2014 | Saha et al. |

(56) References Cited

U.S. PATENT DOCUMENTS

| | | |
|---|---|---|
| 8,825,848 B1 | 9/2014 | Dotan et al. |
| 8,832,013 B1 | 9/2014 | Adams et al. |
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |
| 8,904,520 B1 | 12/2014 | Nachenberg et al. |
| 8,908,685 B2 | 12/2014 | Patel et al. |
| 8,914,497 B1 | 12/2014 | Xiao et al. |
| 8,931,043 B2 | 1/2015 | Cooper et al. |
| 8,954,610 B2 | 2/2015 | Berke et al. |
| 8,955,124 B2 | 2/2015 | Kim et al. |
| 8,966,021 B1 | 2/2015 | Allen |
| 8,966,625 B1 | 2/2015 | Zuk et al. |
| 8,973,147 B2 | 3/2015 | Pearcy et al. |
| 8,984,331 B2 | 3/2015 | Quinn |
| 8,990,386 B2 | 3/2015 | He et al. |
| 8,996,695 B2 | 3/2015 | Anderson et al. |
| 8,997,227 B1 | 3/2015 | Mhatre et al. |
| 9,014,047 B2 | 4/2015 | Alcala et al. |
| 9,015,716 B2 | 4/2015 | Fletcher et al. |
| 9,071,575 B2 | 6/2015 | Lemaster et al. |
| 9,088,598 B1 | 7/2015 | Zhang et al. |
| 9,110,905 B2 | 8/2015 | Polley et al. |
| 9,117,075 B1 | 8/2015 | Yeh |
| 9,130,836 B2 | 9/2015 | Kapadia et al. |
| 9,152,789 B2 | 10/2015 | Natarajan et al. |
| 9,160,764 B2 | 10/2015 | Stiansen et al. |
| 9,170,917 B2 | 10/2015 | Kumar et al. |
| 9,178,906 B1 | 11/2015 | Chen et al. |
| 9,185,127 B2 | 11/2015 | Neou et al. |
| 9,191,400 B1 | 11/2015 | Ptasinski et al. |
| 9,191,402 B2 | 11/2015 | Yan |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,702 B1 | 1/2016 | Sharma et al. |
| 9,246,773 B2 | 1/2016 | Degioanni |
| 9,253,042 B2 | 2/2016 | Lumezanu et al. |
| 9,253,206 B1 | 2/2016 | Fleischman |
| 9,258,217 B2 | 2/2016 | Duffield et al. |
| 9,270,689 B1 * | 2/2016 | Wang .................. H04L 63/1408 |
| 9,281,940 B2 | 3/2016 | Matsuda et al. |
| 9,286,047 B1 | 3/2016 | Avramov et al. |
| 9,294,486 B2 | 3/2016 | Chiang et al. |
| 9,317,574 B1 | 4/2016 | Brisebois et al. |
| 9,319,384 B2 | 4/2016 | Yan et al. |
| 9,369,435 B2 | 6/2016 | Short et al. |
| 9,369,479 B2 | 6/2016 | Lin |
| 9,378,068 B2 | 6/2016 | Anantharam et al. |
| 9,396,327 B2 | 6/2016 | Shimomura et al. |
| 9,405,903 B1 | 8/2016 | Xie et al. |
| 9,417,985 B2 | 8/2016 | Baars et al. |
| 9,418,222 B1 | 8/2016 | Rivera et al. |
| 9,426,068 B2 | 8/2016 | Dunbar et al. |
| 9,454,324 B1 | 9/2016 | Madhavapeddi |
| 9,462,013 B1 | 10/2016 | Boss et al. |
| 9,465,696 B2 | 10/2016 | McNeil et al. |
| 9,501,744 B1 | 11/2016 | Brisebois et al. |
| 9,531,589 B2 | 12/2016 | Clemm et al. |
| 9,563,517 B1 | 2/2017 | Natanzon et al. |
| 9,621,413 B1 | 4/2017 | Lee |
| 9,634,915 B2 | 4/2017 | Bley |
| 9,645,892 B1 | 5/2017 | Patwardhan |
| 9,684,453 B2 | 6/2017 | Holt et al. |
| 9,697,033 B2 | 7/2017 | Koponen et al. |
| 9,733,973 B2 | 8/2017 | Prasad et al. |
| 9,749,145 B2 | 8/2017 | Banavalikar et al. |
| 9,800,608 B2 | 10/2017 | Korsunsky et al. |
| 9,904,584 B2 | 2/2018 | Konig et al. |
| 9,916,538 B2 | 3/2018 | Zadeh et al. |
| 9,935,851 B2 | 4/2018 | Gandham et al. |
| 10,009,240 B2 | 6/2018 | Rao et al. |
| 2001/0028646 A1 | 10/2001 | Arts et al. |
| 2002/0053033 A1 | 5/2002 | Cooper et al. |
| 2002/0097687 A1 | 7/2002 | Meiri et al. |
| 2002/0103793 A1 | 8/2002 | Koller et al. |
| 2002/0107857 A1 | 8/2002 | Teraslinna |
| 2002/0141343 A1 | 10/2002 | Bays |
| 2002/0184393 A1 | 12/2002 | Leddy et al. |
| 2003/0023601 A1 | 1/2003 | Fortier, Jr. et al. |
| 2003/0065986 A1 | 4/2003 | Fraenkel et al. |
| 2003/0097439 A1 | 5/2003 | Strayer et al. |
| 2003/0126242 A1 | 7/2003 | Chang |
| 2003/0145232 A1 | 7/2003 | Poletto et al. |
| 2003/0151513 A1 | 8/2003 | Herrmann et al. |
| 2003/0154399 A1 | 8/2003 | Zuk et al. |
| 2003/0177208 A1 | 9/2003 | Harvey, IV |
| 2003/0188189 A1 * | 10/2003 | Desai .................... H04L 63/104 726/23 |
| 2004/0019676 A1 | 1/2004 | Iwatsuki et al. |
| 2004/0030776 A1 | 2/2004 | Cantrell et al. |
| 2004/0213221 A1 | 10/2004 | Civanlar et al. |
| 2004/0220984 A1 | 11/2004 | Dudfield et al. |
| 2004/0243533 A1 | 12/2004 | Dempster et al. |
| 2004/0255050 A1 | 12/2004 | Takehiro et al. |
| 2004/0268149 A1 | 12/2004 | Aaron |
| 2005/0028154 A1 | 2/2005 | Smith et al. |
| 2005/0039104 A1 | 2/2005 | Shah et al. |
| 2005/0063377 A1 | 3/2005 | Bryant et al. |
| 2005/0083933 A1 | 4/2005 | Fine et al. |
| 2005/0108331 A1 | 5/2005 | Osterman |
| 2005/0122325 A1 | 6/2005 | Twait |
| 2005/0138157 A1 | 6/2005 | Jung et al. |
| 2005/0166066 A1 | 7/2005 | Ahuja et al. |
| 2005/0177829 A1 | 8/2005 | Vishwanath |
| 2005/0182681 A1 | 8/2005 | Bruskotter et al. |
| 2005/0185621 A1 | 8/2005 | Sivakumar et al. |
| 2005/0198247 A1 | 9/2005 | Perry et al. |
| 2005/0198371 A1 | 9/2005 | Smith et al. |
| 2005/0198629 A1 | 9/2005 | Vishwanath |
| 2005/0207376 A1 | 9/2005 | Ashwood-Smith et al. |
| 2005/0257244 A1 | 11/2005 | Joly et al. |
| 2005/0289244 A1 | 12/2005 | Sahu et al. |
| 2006/0048218 A1 | 3/2006 | Lingafelt et al. |
| 2006/0077909 A1 | 4/2006 | Saleh et al. |
| 2006/0080733 A1 | 4/2006 | Khosmood et al. |
| 2006/0089985 A1 | 4/2006 | Poletto |
| 2006/0095968 A1 | 5/2006 | Portolani et al. |
| 2006/0143432 A1 | 6/2006 | Rothman et al. |
| 2006/0156408 A1 | 7/2006 | Himberger et al. |
| 2006/0159032 A1 | 7/2006 | Ukrainetz et al. |
| 2006/0173912 A1 | 8/2006 | Lindvall et al. |
| 2006/0195448 A1 | 8/2006 | Newport |
| 2006/0272018 A1 | 11/2006 | Fouant |
| 2006/0274659 A1 | 12/2006 | Ouderkirk |
| 2006/0280179 A1 | 12/2006 | Meier |
| 2006/0294219 A1 | 12/2006 | Ogawa et al. |
| 2007/0014275 A1 | 1/2007 | Bettink et al. |
| 2007/0025306 A1 | 2/2007 | Cox et al. |
| 2007/0044147 A1 | 2/2007 | Choi et al. |
| 2007/0097976 A1 | 5/2007 | Wood et al. |
| 2007/0118654 A1 | 5/2007 | Jamkhedkar et al. |
| 2007/0127491 A1 | 6/2007 | Verzijp et al. |
| 2007/0162420 A1 | 7/2007 | Ou et al. |
| 2007/0169179 A1 | 7/2007 | Narad |
| 2007/0195729 A1 | 8/2007 | Li et al. |
| 2007/0195794 A1 | 8/2007 | Fujita et al. |
| 2007/0195797 A1 | 8/2007 | Patel et al. |
| 2007/0201474 A1 | 8/2007 | Isobe |
| 2007/0211637 A1 | 9/2007 | Mitchell |
| 2007/0214348 A1 | 9/2007 | Danielsen |
| 2007/0230415 A1 | 10/2007 | Malik |
| 2007/0232265 A1 | 10/2007 | Park et al. |
| 2007/0250930 A1 | 10/2007 | Aziz et al. |
| 2007/0300061 A1 | 12/2007 | Kim et al. |
| 2008/0002697 A1 | 1/2008 | Anantharamaiah et al. |
| 2008/0022385 A1 | 1/2008 | Crowell et al. |
| 2008/0028389 A1 | 1/2008 | Genty et al. |
| 2008/0046708 A1 | 2/2008 | Fitzgerald et al. |
| 2008/0049633 A1 | 2/2008 | Edwards et al. |
| 2008/0056124 A1 | 3/2008 | Nanda et al. |
| 2008/0082662 A1 | 4/2008 | Danliker et al. |
| 2008/0101234 A1 | 5/2008 | Nakil et al. |

(56) References Cited

U.S. PATENT DOCUMENTS

| | | |
|---|---|---|
| 2008/0120350 A1 | 5/2008 | Grabowski et al. |
| 2008/0126534 A1 | 5/2008 | Mueller et al. |
| 2008/0141246 A1 | 6/2008 | Kuck et al. |
| 2008/0155245 A1 | 6/2008 | Lipscombe et al. |
| 2008/0250122 A1 | 10/2008 | Zsigmond et al. |
| 2008/0270199 A1 | 10/2008 | Chess et al. |
| 2008/0282347 A1 | 11/2008 | Dadhia et al. |
| 2008/0295163 A1 | 11/2008 | Kang |
| 2008/0301765 A1 | 12/2008 | Nicol et al. |
| 2009/0059934 A1 | 3/2009 | Aggarwal et al. |
| 2009/0064332 A1 | 3/2009 | Porras et al. |
| 2009/0109849 A1 | 4/2009 | Wood et al. |
| 2009/0133126 A1 | 5/2009 | Jang et al. |
| 2009/0138590 A1 | 5/2009 | Lee et al. |
| 2009/0180393 A1 | 7/2009 | Nakamura |
| 2009/0241170 A1 | 9/2009 | Kumar et al. |
| 2009/0292795 A1 | 11/2009 | Ford et al. |
| 2009/0296593 A1 | 12/2009 | Prescott |
| 2009/0300180 A1 | 12/2009 | Dehaan et al. |
| 2009/0307753 A1 | 12/2009 | Dupont et al. |
| 2009/0313373 A1 | 12/2009 | Hanna et al. |
| 2009/0313698 A1 | 12/2009 | Wahl |
| 2009/0319912 A1 | 12/2009 | Serr et al. |
| 2009/0323543 A1 | 12/2009 | Shimakura |
| 2009/0328219 A1 | 12/2009 | Narayanaswamy |
| 2010/0005288 A1 | 1/2010 | Rao et al. |
| 2010/0049839 A1 | 2/2010 | Parker et al. |
| 2010/0054241 A1 | 3/2010 | Shah et al. |
| 2010/0077445 A1 | 3/2010 | Schneider et al. |
| 2010/0095293 A1 | 4/2010 | O'Neill et al. |
| 2010/0095367 A1 | 4/2010 | Narayanaswamy |
| 2010/0095377 A1 | 4/2010 | Krywaniuk |
| 2010/0138526 A1 | 6/2010 | DeHaan et al. |
| 2010/0138810 A1 | 6/2010 | Komatsu et al. |
| 2010/0148940 A1 | 6/2010 | Gelvin et al. |
| 2010/0153316 A1 | 6/2010 | Duffield et al. |
| 2010/0153696 A1 | 6/2010 | Beachem et al. |
| 2010/0180016 A1 | 7/2010 | Bugwadia et al. |
| 2010/0194741 A1 | 8/2010 | Finocchio |
| 2010/0220584 A1 | 9/2010 | DeHaan et al. |
| 2010/0235514 A1 | 9/2010 | Beachem |
| 2010/0235879 A1 | 9/2010 | Burnside et al. |
| 2010/0235915 A1 | 9/2010 | Memon et al. |
| 2010/0287266 A1 | 11/2010 | Asati et al. |
| 2010/0303240 A1 | 12/2010 | Beachem |
| 2010/0306180 A1 | 12/2010 | Johnson et al. |
| 2010/0317420 A1 | 12/2010 | Hoffberg |
| 2010/0319060 A1 | 12/2010 | Aiken et al. |
| 2011/0004935 A1 | 1/2011 | Moffie et al. |
| 2011/0010585 A1 | 1/2011 | Bugenhagen et al. |
| 2011/0022641 A1 | 1/2011 | Werth et al. |
| 2011/0055381 A1 | 3/2011 | Narasimhan et al. |
| 2011/0055388 A1 | 3/2011 | Yumerefendi et al. |
| 2011/0066719 A1 | 3/2011 | Miryanov et al. |
| 2011/0069685 A1 | 3/2011 | Tofighbakhsh |
| 2011/0072119 A1 | 3/2011 | Bronstein et al. |
| 2011/0083125 A1 | 4/2011 | Komatsu et al. |
| 2011/0085556 A1 | 4/2011 | Breslin et al. |
| 2011/0103259 A1 | 5/2011 | Aybay et al. |
| 2011/0107074 A1 | 5/2011 | Chan et al. |
| 2011/0107331 A1 | 5/2011 | Evans et al. |
| 2011/0126136 A1 | 5/2011 | Abella et al. |
| 2011/0126275 A1 | 5/2011 | Anderson et al. |
| 2011/0145885 A1 | 6/2011 | Rivers et al. |
| 2011/0153039 A1 | 6/2011 | Gvelesiani et al. |
| 2011/0153811 A1 | 6/2011 | Jeong et al. |
| 2011/0158088 A1 | 6/2011 | Lofstrand et al. |
| 2011/0170860 A1 | 7/2011 | Smith et al. |
| 2011/0173490 A1 | 7/2011 | Narayanaswamy et al. |
| 2011/0185423 A1 | 7/2011 | Sallam |
| 2011/0196957 A1 | 8/2011 | Ayachitula et al. |
| 2011/0202655 A1 | 8/2011 | Sharma et al. |
| 2011/0214174 A1 | 9/2011 | Herzog et al. |
| 2011/0225207 A1 | 9/2011 | Subramanian et al. |
| 2011/0228696 A1 | 9/2011 | Agarwal et al. |
| 2011/0238793 A1 | 9/2011 | Bedare et al. |
| 2011/0246663 A1 | 10/2011 | Melsen et al. |
| 2011/0277034 A1 | 11/2011 | Hanson |
| 2011/0283277 A1 | 11/2011 | Castillo et al. |
| 2011/0302652 A1 | 12/2011 | Westerfeld |
| 2011/0314148 A1 | 12/2011 | Petersen et al. |
| 2011/0317982 A1 | 12/2011 | Xu et al. |
| 2012/0005542 A1 | 1/2012 | Petersen et al. |
| 2012/0079592 A1 | 3/2012 | Pandrangi |
| 2012/0089664 A1 | 4/2012 | Igelka |
| 2012/0102361 A1 | 4/2012 | Sass et al. |
| 2012/0102543 A1 | 4/2012 | Kohli et al. |
| 2012/0110188 A1 | 5/2012 | Van Biljon et al. |
| 2012/0117226 A1 | 5/2012 | Tanaka et al. |
| 2012/0117642 A1 | 5/2012 | Lin et al. |
| 2012/0136996 A1 | 5/2012 | Seo et al. |
| 2012/0137278 A1 | 5/2012 | Draper et al. |
| 2012/0137361 A1 | 5/2012 | Yi et al. |
| 2012/0140626 A1 | 6/2012 | Anand et al. |
| 2012/0195198 A1 | 8/2012 | Regan |
| 2012/0197856 A1 | 8/2012 | Banka et al. |
| 2012/0198541 A1 | 8/2012 | Reeves |
| 2012/0216271 A1 | 8/2012 | Cooper et al. |
| 2012/0218989 A1 | 8/2012 | Tanabe et al. |
| 2012/0219004 A1 | 8/2012 | Balus et al. |
| 2012/0233348 A1 | 9/2012 | Winters |
| 2012/0233473 A1 | 9/2012 | Vasseur et al. |
| 2012/0240232 A1 | 9/2012 | Azuma |
| 2012/0246303 A1 | 9/2012 | Petersen et al. |
| 2012/0254109 A1 | 10/2012 | Shukla et al. |
| 2012/0260227 A1 | 10/2012 | Shukla et al. |
| 2012/0278021 A1 | 11/2012 | Lin et al. |
| 2012/0281700 A1 | 11/2012 | Koganti et al. |
| 2012/0300628 A1 | 11/2012 | Prescott et al. |
| 2013/0003538 A1 | 1/2013 | Greenburg et al. |
| 2013/0003733 A1 | 1/2013 | Venkatesan et al. |
| 2013/0006935 A1 | 1/2013 | Grisby |
| 2013/0007435 A1 | 1/2013 | Bayani |
| 2013/0038358 A1 | 2/2013 | Cook et al. |
| 2013/0041934 A1 | 2/2013 | Annamalaisami et al. |
| 2013/0054682 A1 | 2/2013 | Malik et al. |
| 2013/0085889 A1 | 4/2013 | Fitting et al. |
| 2013/0086272 A1 | 4/2013 | Chen et al. |
| 2013/0103827 A1 | 4/2013 | Dunlap et al. |
| 2013/0107709 A1 | 5/2013 | Campbell et al. |
| 2013/0124807 A1 | 5/2013 | Nielsen et al. |
| 2013/0125107 A1 | 5/2013 | Bandakka et al. |
| 2013/0145099 A1 | 6/2013 | Liu et al. |
| 2013/0148663 A1 | 6/2013 | Xiong |
| 2013/0159999 A1 | 6/2013 | Chiueh et al. |
| 2013/0173784 A1 | 7/2013 | Wang et al. |
| 2013/0174256 A1 | 7/2013 | Powers |
| 2013/0179487 A1 | 7/2013 | Lubetzky et al. |
| 2013/0179879 A1 | 7/2013 | Zhang et al. |
| 2013/0198517 A1 | 8/2013 | Mazzarella |
| 2013/0198839 A1 | 8/2013 | Wei et al. |
| 2013/0201986 A1 | 8/2013 | Sajassi et al. |
| 2013/0205293 A1 | 8/2013 | Levijarvi et al. |
| 2013/0219161 A1 | 8/2013 | Fontignie et al. |
| 2013/0219500 A1 | 8/2013 | Lukas et al. |
| 2013/0232498 A1 | 9/2013 | Mangtani et al. |
| 2013/0242999 A1 | 9/2013 | Kamble et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283374 A1 | 10/2013 | Zisapel et al. |
| 2013/0290521 A1 | 10/2013 | Labovitz |
| 2013/0297771 A1 | 11/2013 | Osterloh et al. |
| 2013/0301472 A1 | 11/2013 | Allan |
| 2013/0304900 A1 | 11/2013 | Trabelsi et al. |
| 2013/0305369 A1 | 11/2013 | Karta et al. |
| 2013/0318357 A1 | 11/2013 | Abraham et al. |
| 2013/0326623 A1 | 12/2013 | Kruglick |
| 2013/0333029 A1 | 12/2013 | Chesla et al. |
| 2013/0336164 A1 | 12/2013 | Yang et al. |
| 2013/0343213 A1* | 12/2013 | Reynolds ............ H04L 43/045 370/252 |

(56) References Cited

U.S. PATENT DOCUMENTS

| | | |
|---|---|---|
| 2013/0346736 A1 | 12/2013 | Cook et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0012814 A1 | 1/2014 | Bercovici et al. |
| 2014/0019972 A1 | 1/2014 | Yahalom et al. |
| 2014/0031005 A1 | 1/2014 | Sumcad et al. |
| 2014/0033193 A1 | 1/2014 | Palaniappan |
| 2014/0036688 A1 | 2/2014 | Stassinopoulos et al. |
| 2014/0040343 A1 | 2/2014 | Nickolov et al. |
| 2014/0047185 A1 | 2/2014 | Peterson et al. |
| 2014/0047372 A1 | 2/2014 | Gnezdov et al. |
| 2014/0056318 A1 | 2/2014 | Hansson et al. |
| 2014/0059200 A1 | 2/2014 | Nguyen et al. |
| 2014/0074946 A1 | 3/2014 | Dirstine et al. |
| 2014/0089494 A1 | 3/2014 | Dasari et al. |
| 2014/0092884 A1 | 4/2014 | Murphy et al. |
| 2014/0096058 A1 | 4/2014 | Molesky et al. |
| 2014/0105029 A1 | 4/2014 | Jain et al. |
| 2014/0115219 A1 | 4/2014 | Ajanovic et al. |
| 2014/0129942 A1 | 5/2014 | Rathod |
| 2014/0137109 A1 | 5/2014 | Sharma et al. |
| 2014/0140244 A1 | 5/2014 | Kapadia et al. |
| 2014/0143825 A1 | 5/2014 | Behrendt et al. |
| 2014/0149490 A1 | 5/2014 | Luxenberg et al. |
| 2014/0156814 A1 | 6/2014 | Barabash et al. |
| 2014/0156861 A1 | 6/2014 | Cruz-Aguilar et al. |
| 2014/0164607 A1 | 6/2014 | Bai et al. |
| 2014/0165200 A1 | 6/2014 | Singla |
| 2014/0165207 A1 | 6/2014 | Engel et al. |
| 2014/0173623 A1 | 6/2014 | Chang et al. |
| 2014/0192639 A1 | 7/2014 | Smirnov |
| 2014/0201717 A1 | 7/2014 | Mascaro et al. |
| 2014/0215573 A1 | 7/2014 | Cepuran |
| 2014/0215621 A1 | 7/2014 | Xaypanya et al. |
| 2014/0224784 A1 | 8/2014 | Kohler |
| 2014/0225603 A1 | 8/2014 | Auguste et al. |
| 2014/0233387 A1 | 8/2014 | Zheng et al. |
| 2014/0269777 A1 | 9/2014 | Rothstein et al. |
| 2014/0280499 A1 | 9/2014 | Basavaiah et al. |
| 2014/0281030 A1 | 9/2014 | Cui et al. |
| 2014/0286354 A1 | 9/2014 | Van De Poel et al. |
| 2014/0289854 A1 | 9/2014 | Mahvi |
| 2014/0298461 A1 | 10/2014 | Hohndel et al. |
| 2014/0307686 A1 | 10/2014 | Su et al. |
| 2014/0317278 A1 | 10/2014 | Kersch et al. |
| 2014/0317737 A1 | 10/2014 | Shin et al. |
| 2014/0330616 A1 | 11/2014 | Lyras |
| 2014/0331048 A1 | 11/2014 | Casas-Sanchez et al. |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0344186 A1* | 11/2014 | Nadler ............... G06Q 10/067 705/36 R |
| 2014/0348182 A1 | 11/2014 | Chandra et al. |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2015/0006689 A1 | 1/2015 | Szilagyi et al. |
| 2015/0006714 A1 | 1/2015 | Jain |
| 2015/0009840 A1 | 1/2015 | Pruthi et al. |
| 2015/0026809 A1 | 1/2015 | Altman et al. |
| 2015/0033305 A1 | 1/2015 | Shear et al. |
| 2015/0036480 A1 | 2/2015 | Huang et al. |
| 2015/0036533 A1 | 2/2015 | Sodhi et al. |
| 2015/0039751 A1 | 2/2015 | Harrigan et al. |
| 2015/0046882 A1 | 2/2015 | Menyhart et al. |
| 2015/0052441 A1 | 2/2015 | Degioanni |
| 2015/0058976 A1 | 2/2015 | Carney et al. |
| 2015/0067143 A1 | 3/2015 | Babakhan et al. |
| 2015/0067786 A1 | 3/2015 | Fiske |
| 2015/0082151 A1 | 3/2015 | Liang et al. |
| 2015/0082430 A1 | 3/2015 | Sridhara et al. |
| 2015/0085665 A1 | 3/2015 | Kompella et al. |
| 2015/0095332 A1 | 4/2015 | Beisiegel et al. |
| 2015/0112933 A1 | 4/2015 | Satapathy |
| 2015/0113133 A1 | 4/2015 | Srinivas et al. |
| 2015/0124608 A1 | 5/2015 | Agarwal et al. |
| 2015/0124652 A1 | 5/2015 | Dhamapurikar et al. |
| 2015/0128133 A1 | 5/2015 | Pohlmann |
| 2015/0128205 A1 | 5/2015 | Mahaffey et al. |
| 2015/0138993 A1 | 5/2015 | Forster et al. |
| 2015/0142962 A1 | 5/2015 | Srinivas et al. |
| 2015/0195291 A1 | 7/2015 | Zuk et al. |
| 2015/0222939 A1 | 8/2015 | Gallant et al. |
| 2015/0249622 A1 | 9/2015 | Phillips et al. |
| 2015/0256555 A1 | 9/2015 | Choi et al. |
| 2015/0261842 A1 | 9/2015 | Huang et al. |
| 2015/0261886 A1 | 9/2015 | Wu et al. |
| 2015/0271008 A1 | 9/2015 | Jain et al. |
| 2015/0271255 A1 | 9/2015 | MacKay et al. |
| 2015/0295945 A1 | 10/2015 | Canzanese, Jr. et al. |
| 2015/0312233 A1 | 10/2015 | Graham, III et al. |
| 2015/0356297 A1 | 10/2015 | Yang et al. |
| 2015/0347554 A1 | 12/2015 | Vasantham et al. |
| 2015/0358352 A1 | 12/2015 | Chasin et al. |
| 2016/0006753 A1 | 1/2016 | McDaid et al. |
| 2016/0019030 A1 | 1/2016 | Shukla et al. |
| 2016/0020959 A1 | 1/2016 | Rahaman |
| 2016/0021131 A1 | 1/2016 | Heilig |
| 2016/0026552 A1 | 1/2016 | Holden et al. |
| 2016/0036636 A1 | 2/2016 | Erickson et al. |
| 2016/0036837 A1 | 2/2016 | Jain et al. |
| 2016/0050132 A1 | 2/2016 | Zhang et al. |
| 2016/0072815 A1 | 3/2016 | Rieke et al. |
| 2016/0080414 A1 | 3/2016 | Kolton et al. |
| 2016/0087861 A1 | 3/2016 | Kuan et al. |
| 2016/0094394 A1 | 3/2016 | Sharma et al. |
| 2016/0094529 A1 | 3/2016 | Mityagin |
| 2016/0103692 A1 | 4/2016 | Guntaka et al. |
| 2016/0105350 A1 | 4/2016 | Greifeneder et al. |
| 2016/0112270 A1 | 4/2016 | Danait et al. |
| 2016/0112284 A1 | 4/2016 | Pon et al. |
| 2016/0119234 A1 | 4/2016 | Valencia Lopez et al. |
| 2016/0127395 A1 | 5/2016 | Underwood et al. |
| 2016/0147585 A1 | 5/2016 | Konig et al. |
| 2016/0162308 A1 | 6/2016 | Chen et al. |
| 2016/0162312 A1 | 6/2016 | Doherty et al. |
| 2016/0173446 A1 | 6/2016 | Nantel |
| 2016/0173535 A1 | 6/2016 | Barabash et al. |
| 2016/0183093 A1 | 6/2016 | Vaughn et al. |
| 2016/0191476 A1 | 6/2016 | Schutz et al. |
| 2016/0205002 A1 | 7/2016 | Rieke et al. |
| 2016/0216994 A1 | 7/2016 | Sefidcon et al. |
| 2016/0217022 A1 | 7/2016 | Velipasaoglu et al. |
| 2016/0255082 A1 | 9/2016 | Rathod |
| 2016/0269424 A1 | 9/2016 | Chandola et al. |
| 2016/0269442 A1 | 9/2016 | Shieh |
| 2016/0269482 A1 | 9/2016 | Jamjoom et al. |
| 2016/0294691 A1 | 10/2016 | Joshi |
| 2016/0308908 A1 | 10/2016 | Kirby et al. |
| 2016/0337204 A1 | 11/2016 | Dubey et al. |
| 2016/0357424 A1 | 12/2016 | Pang et al. |
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1 | 12/2016 | Madani et al. |
| 2016/0359679 A1 | 12/2016 | Parasdehgheibi et al. |
| 2016/0359680 A1 | 12/2016 | Parasdehgheibi et al. |
| 2016/0359686 A1 | 12/2016 | Parasdehgheibi et al. |
| 2016/0359695 A1 | 12/2016 | Yadav et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |

(56) References Cited

U.S. PATENT DOCUMENTS

| | | |
|---|---|---|
| 2016/0359705 A1 | 12/2016 | Parasdehgheibi et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parasdehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359905 A1 | 12/2016 | Touboul et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2016/0373481 A1 | 12/2016 | Sultan et al. |
| 2016/0380865 A1 | 12/2016 | Dubai et al. |
| 2017/0006141 A1 | 1/2017 | Bhadra |
| 2017/0024453 A1 | 1/2017 | Raja et al. |
| 2017/0032310 A1 | 2/2017 | Mimnaugh |
| 2017/0034018 A1 | 2/2017 | Parasdehgheibi et al. |
| 2017/0048121 A1 | 2/2017 | Hobbs et al. |
| 2017/0070582 A1 | 3/2017 | Desai et al. |
| 2017/0085483 A1 | 3/2017 | Mihaly et al. |
| 2017/0208487 A1 | 7/2017 | Ratakonda et al. |
| 2017/0250880 A1 | 8/2017 | Akens et al. |
| 2017/0250951 A1 | 8/2017 | Wang et al. |
| 2017/0289067 A1 | 10/2017 | Lu et al. |
| 2017/0295141 A1 | 10/2017 | Thubert et al. |
| 2017/0302505 A1* | 10/2017 | Zafer ................. H04L 41/0631 |
| 2017/0302691 A1 | 10/2017 | Singh et al. |
| 2017/0331747 A1 | 11/2017 | Singh et al. |
| 2017/0346736 A1 | 11/2017 | Chander et al. |
| 2017/0364380 A1 | 12/2017 | Frye, Jr. et al. |
| 2018/0006911 A1 | 1/2018 | Dickey |
| 2018/0007115 A1 | 1/2018 | Nedeltchev et al. |
| 2018/0013670 A1 | 1/2018 | Kapadia et al. |
| 2018/0145906 A1 | 5/2018 | Yadav et al. |

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| CN | 107196807 | 9/2017 |
| EP | 0811942 | 12/1997 |
| EP | 1076848 | 7/2002 |
| EP | 1383261 | 1/2004 |
| EP | 1450511 | 8/2004 |
| EP | 2045974 | 4/2008 |
| EP | 2043320 | 4/2009 |
| EP | 2860912 | 4/2015 |
| EP | 2887595 | 6/2015 |
| JP | 2009-016906 | 1/2009 |
| KR | 1394338 | 5/2014 |
| WO | WO 2007/014314 | 2/2007 |
| WO | WO 2007/070711 | 6/2007 |
| WO | WO 2008/069439 | 6/2008 |
| WO | WO 2013/030830 | 3/2013 |
| WO | WO 2015/042171 | 3/2015 |
| WO | WO 2015/099778 | 7/2015 |
| WO | WO 2016/004075 | 1/2016 |
| WO | WO 2016/019523 | 2/2016 |

OTHER PUBLICATIONS

Baek, Kwang-Hyun, et al., "Preventing Theft of Quality of Service on Open Platforms," 2005 Workshop of the 1$^{st}$ International Conference on Security and Privacy for Emerging Areas in Communication Networks, 2005, 12 pages.

Brocade Communications Systems, Inc., "Chapter 5—Configuring Virtual LANs (VLANs)," Jun. 2009, 38 pages.

Cisco Systems, Inc. "Cisco, Nexus 3000 Series NX-OS Release Notes, Release 5.0(3)U3(1)," Feb. 29, 2012, Part No. OL-26631-01, 16 pages.

Cisco Systems, Inc., "Cisco—VPN Client User Guide for Windows," Release 4.6, Aug. 2004, 148 pages.

Cisco Systems, Inc., "Cisco 4710 Application Control Engine Appliance Hardware Installation Guide," Nov. 2007, 66 pages.

Cisco Systems, Inc., "Cisco Data Center Network Architecture and Solutions Overview," Feb. 2006, 19 pages.

Cisco Systems, Inc., "Cisco IOS Configuration Fundamentals Configuration Guide: *Using Autoinstall and Setup*,"Release 12.2, first published Apr. 2001, last updated Sep. 2003, 32 pages.

Cisco Systems, Inc., "Cisco VN-Link: Virtualization-Aware Networking," White Paper, Mar. 2009, 10 pages.

Cisco Systems, Inc., "Cisco, Nexus 5000 Series and Cisco Nexus 2000 Series Release Notes, Cisco NX-OS Release 5.1(3)N2(1b), NX-OS Release 5.1(3)N2(1a) and NX-OS Release 5.1(3)N2(1)," Sep. 5, 2012, Part No. OL-26652-03 CO, 24 pages.

Cisco Systems, Inc., "Nexus 3000 Series NX-OS Fundamentals Configuration Guide, Release 5.0(3)U3(1): *Using PowerOn Auto Provisioning*," Feb. 29, 2012, Part No. OL-26544-01, 10 pages.

Cisco Systems, Inc., "Quick Start Guide, Cisco ACE 4700 Series Application Control Engine Appliance," Software Ve740rsion A5(1.0), Sep. 2011, 138 pages.

Cisco Systems, Inc., "Routing and Bridging Guide, Cisco ACE Application Control Engine," Software Version A5(1.0), Sep. 2011, 248 pages.

Cisco Systems, Inc., "VMWare and Cisco Virtualization Solution: Scale Virtual Machine Networking," Jul. 2009, 4 pages.

Cisco Systems, Inc., "Cisco Remote Integrated Service Engine for Citrix NetScaler Appliances and Cisco Nexus 7000 Series Switches Configuration Guide," Last modified Apr. 29, 2014, 78 pages.

Cisco Technology, Inc., "Cisco IOS Software Release 12.4T Features and Hardware Support," Feb. 2009, 174 pages.

Cisco Systems, Inc., "Cisco Application Control Engine (ACE) Troubleshooting Guide—Understanding the ACE Module Architecture and Traffic Flow," Mar. 11, 2011, 6 pages.

Costa, Raul, et al., "An Intelligent Alarm Management System for Large-Scale Telecommunication Companies," In Portuguese Conference on Artificial Intelligence, Oct. 2009, 14 pages.

Foundation for Intelligent Physical Agents, "FIPA Agent Message Transport Service Specification," Dec. 3, 2002, http://www.fipa.org; 15 pages.

Gia, Tuan Nguyen, et al., "Fog Computing in Healthcare Internet of Things: A Case Study on ECG Feature Extraction," 2015 IEEE International Conference on Computer and Information Technology; Ubiquitous Computing and Communications; Dependable, Autonomic and Secure Computing; Pervasive Intelligence and Computing, Oct. 26, 2015, pp. 356-363.

Joseph, Dilip, et al., "Modeling Middleboxes," IEEE Network, Sep./Oct. 2008, pp. 20-25.

Kent, S., et al. "Security Architecture for the Internet Protocol," Network Working Group, Nov. 1998, 67 pages.

Online Collins English Dictionary, 1 page (Year: 2018).

Theodorakopoulos, George, et al., "On Trust Models and Trust Evaluation Metrics for Ad Hoc Networks," IEEE Journal on Selected Areas in Communications. vol. 24, Issue 2, Feb. 2006, pp. 318-328.

Voris, Jonathan, et al., "Bait and Snitch: Defending Computer Systems with Decoys," Columbia University Libraries, Department of Computer Science, 2013, pp. 1-25.

Zeng, Sai, et al., "Managing Risk in Multi-node Automation of Endpoint Management," 2014 IEEE Network Operations and Management Symposium (NOMS), 2014, 6 pages.

(56) References Cited

OTHER PUBLICATIONS

Carvalho, "Root Cause Analysis in Large and Complex Networks," Dec. 2008, Repositorio.ul.pt, pp. 1-55.
Arista Networks, Inc., "Application Visibility and Network Telemtry using Splunk," Arista White Paper, Nov. 2013, 11 pages.
Australian Government Department of Defence, Intelligence and Security, "Top 4 Strategies to Mitigate Targeted Cyber Intrusions," Cyber Security Operations Centre July 2013, http://www.asd.gov.au/infosec/top-mitigations/top-4-strategies-explained.htm.
Author Unknown, "Blacklists & Dynamic Reputation: Understanding Why the Evolving Threat Eludes Blacklists," www.dambala.com, 9 pages, Dambala, Atlanta, GA, USA.
Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.
Backes, Michael, et al., "Data Lineage in Malicious Environments," IEEE 2015, pp. 1-13.
Bauch, Petr, "Reader's Report of Master's Thesis, Analysis and Testing of Distributed NoSQL Datastore Riak," May 28, 2015, Brno. 2 pages.
Bayati, Mohsen, et al., "Message-Passing Algorithms for Sparse Network Alignment," Mar. 2013, 31 pages.
Berezinski, Przemyslaw, et al., "An Entropy-Based Network Anomaly Detection Method," Entropy, 2015, vol. 17, www.mdpi.com/journal/entropy, pp. 2367-2408.
Berthier, Robin, et al. "Nfsight: Netflow-based Network Awareness Tool," 2010, 16 pages.
Bhuyan, Dhiraj, "Fighting Bots and Botnets," 2006, pp. 23-28.
Blair, Dana, et al., U.S. Appl. No. 62/106,006, tiled Jan. 21, 2015, entitled "Monitoring Network Policy Compliance."
Bosch, Greg, "Virtualization," 2010, 33 pages.
Breen, Christopher, "MAC 911, How to dismiss Mac App Store Notifications," Macworld.com, Mar. 24, 2014, 3 pages.
Chandran, Midhun, et al., "Monitoring in a Virtualized Environment," GSTF International Journal on Computing, Vol. 1, No. 1, Aug. 2010.
Chari, Suresh, et al., "Ensuring continuous compliance through reconciling policy with usage," Proceedings of the 18$^{th}$ ACM symposium on Access control models and technologies (SACMAT '13). ACM, New York, NY, USA, 49-60.
Chen, Xu, et al., "Automating network application dependency discovery: experiences, limitations, and new solutions," 8th USENIX conference on Operating systems design and implementation (OSDI'08), USENIX Association, Berkeley, CA, USA, 117-130.
Chou, C.W., et al., "Optical Clocks and Relativity," Science vol. 329, Sep. 24, 2010, pp. 1630-1633.
Cisco Systems, "Cisco Network Analysis Modules (NAM) Tutorial," Cisco Systems, Inc., Version 3.5.
Cisco Systems, Inc., "Addressing Compliance from One Infrastructure: Cisco Unified Compliance Solution Framework," 2014.
Cisco Systems, Inc., "Cisco Application Dependency Mapping Service," 2009.
Cisco Systems, Inc., "White Paper—New Cisco Technologies Help Customers Achieve Regulatory Compliance," 1992-2008.
Cisco Systems, Inc., "A Cisco Guide to Defending Against Distributed Denial of Service Attacks," May 3, 2016, 34 pages.
Cisco Systems, Inc., "Cisco Application Visibility and Control," Oct. 2011, 2 pages.
Cisco Systems, Inc., "Cisco Tetration Platform Data Sheet", Updated Mar. 5, 2018, 21 pages.
Cisco Technology, Inc., "Cisco Lock-and-Key:Dynamic Access Lists," http://www.cisco.com/c/en/us/support/docs/security-vpn/lock-key7604-13.html; Updated Jul. 12, 2006, 16 pages.
Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.
Duan, Yiheng, et al., Detective: Automatically Identify and Analyze Malware Processes in Forensic Scenarios via DLLs, IEEE ICC 2015—Next Generation Networking Symposium, pp. 5691-5696.
Feinstein, Laura, et al., "Statistical Approaches to DDoS Attack Detection and Response," Proceedings of the DARPA Information Survivability Conference and Exposition (DISCEX '03), Apr. 2003, 12 pages.
George, Ashley, et al., "NetPal: A Dynamic Network Administration Knowledge Base," 2008, pp. 1-14.
Goldsteen, Abigail, et al., "A Tool for Monitoring and Maintaining System Trustworthiness at Run Time," REFSQ (2015), pp. 142-147.
Hamadi, S., et al., "Fast Path Acceleration for Open vSwitch in Overlay Networks," Global Information Infrastructure and Networking Symposium (GIIS), Montreal, QC, pp. 1-5, Sep. 15-19, 2014.
Heckman, Sarah, et al., "On Establishing a Benchmark for Evaluating Static Analysis Alert Prioritization and Classification Techniques," IEEE, 2008; 10 pages.
Hewlett-Packard, "Effective use of reputation intelligence in a security operations center," Jul. 2013, 6 pages.
Hideshima, Yusuke, et al., "STARMINE: A Visualization System for Cyber Attacks," https://www.researchgate.net/publication/221536306, Feb. 2006, 9 pages.
Huang, Hing-Jie, et al., "Clock Skew Based Node Identification in Wireless Sensor Networks," IEEE, 2008, 5 pages.
InternetPerils, Inc., "Control Your Internet Business Risk," 2003-2015, https://www.internetperils.com.
Ives, Herbert, E., et al., "An Experimental Study of the Rate of a Moving Atomic Clock," Journal of the Optical Society of America, vol. 28, No. 7, Jul. 1938, pp. 215-226.
Janoff, Christian, et al., "Cisco Compliance Solution for HIPAA Security Rule Design and Implementation Guide," Cisco Systems, Inc., Updated Nov. 14, 2015, part 1 of 2, 350 pages.
Janoff, Christian, et al., "Cisco Compliance Solution for HIPAA Security Rule Design and Implementation Guide," Cisco Systems, Inc., Updated Nov. 14, 2015, part 2 of 2, 588 pages.
Kerrison, Adam, et al., "Four Steps to Faster, Better Application Dependency Mapping—Laying the Foundation for Effective Business Service Models," BMCSoftware, 2011.
Kim, Myung-Sup, et al. "A Flow-based Method for Abnormal Network Traffic Detection, " IEEE, 2004, pp. 599-612.
Kraemer, Brian, "Get to know your data center with CMDB," TechTarget, Apr. 5, 2006, http://searchdatacenter.techtarget.com/news/118820/Get-to-know-your-data-center-with-CMDB.
Lab SKU, "VMware Hands-on Labs—HOL-SDC-1301" Version: 20140321-160709, 2013; http://docs.hol.vmware.com/HOL-2013/holsdc-1301_html_en/, (part 1 or 2).
Lab SKU, "VMware Hands-on Labs—HOL-SDC-1301" Version: 20140321-160709, 2013; http://docs.hol.vmware.com/HOL-2013/holsdc-1301_html_en/ (part 2 of 2).
Lachance, Michael, "Dirty Little Secrets of Application Dependency Mapping," Dec. 26, 2007.
Landman, Yoav, et al., "Dependency Analyzer," Feb. 14, 2008, http://jfrog.com/confluence/display/DA/Home.
Lee, Sihyung, "Reducing Complexity of Large-Scale Network Configuration Management," Ph.D. Dissertation, Carniege Mellon University, 2010.
Li, Ang, et al., "Fast Anomaly Detection for Large Data Centers," Global Telecommunications Conference (GLOBECOM 2010, Dec. 2010, 6 pages.
Li, Bingbong, et al, "A Supervised Machine Learning Approach to Classify Host Roles on Line Using sFlow," in Proceedings of the first edition workshop on High performance and programmable networking, 2013, ACM, New York, NY, USA, 53-60.
Liu, Ting, et al., "Impala: A Middleware System for Managing Autonomic, Parallel Sensor Systems," In Proceedings of the Ninth ACM SIGPLAN Symposium on Principles and Practice of Parallel Programming(PPoPP '03), ACM, New York, NY, USA, Jun. 11-13, 2003, pp. 107-118.
Lu, Zhonghai, et al., "Cluster-based Simulated Annealing for Mapping Cores onto 2D Mesh Networks on Chip," Design and Diagnostics of Electronic Circuits and Systems, pp. 1, 6, 16-18, Apr. 2008.
Matteson, Ryan, "Depmap: Dependency Mapping of Applications Using Operating System Events: a Thesis," Master's Thesis, California Polytechnic State University, Dec. 2010.

(56) References Cited

OTHER PUBLICATIONS

Natarajan, Arun, et al., "NSDMiner: Automated Discovery of Network Service Dependencies," Institute of Electrical and Electronics Engineers INFOCOM, Feb. 2012, 9 pages.

Navaz, a.S. Syed, et al., "Entropy based Anomaly Detection System to Prevent DDoS Attacks in Cloud," International Journal of computer Applications (0975-8887), vol. 62, No. 15, Jan. 2013, pp. 42-47.

Neverfail, "Neverfail IT Continuity Architect," 2015, https://web.archive.org/web/20150908090456/http://www.neverfallgroup.com/products/it-continuity-architect.

Nilsson, Dennis K., et al., "Key Management and Secure Software Updates in Wireless Process Control Environments," In Proceedings of the First ACM Conference on Wireless Network Security (WiSec '08), ACM, New York, NY, USA, Mar. 31-Apr. 2, 2008, pp. 100-108.

Nunnally, Troy, et al., "P3D: A Parallel 3D Coordinate Visualization for Advanced Network Scans," IEEE 2013, Jun. 9-13, 2013, 6 pages.

O'Donnell, Glenn, et al., "The CMDG Imperative: How to Realize the Dream and Avoid the Nightmares," Prentice Hall, Feb. 19, 2009.

Ohta, Kohei, et al., "Detection, Defense, and Tracking of Internet-Wide Illegal Access in a Distributed Manner," 2000, pp. 1-16.

Pathway Systems International Inc., "How Blueprints does Integration," Apr. 15, 2014, 9 pages, http://pathwaysystems.com/company-biog/.

Pathway Systems International Inc., "What is Blueprints?" 2010-2016, http://pathwaysystems.com/blueprints-about/.

Popa, Lucian, et al., "Macroscope: End-Point Approach to Networked Application Dependency Discovery," CoNEXT'09, Dec. 1-4, 2009, Rome, Italy, 12 pages.

Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.

Sachan, Mrinmaya, et al., "Solving Electrical Networks to incorporate Supervision in Random Walks," May 13-17, 2013, pp. 109-110.

Sammarco, Matteo, et al., "Trace Selection for Improved WLAN Monitoring," Aug. 16, 2013, pp. 9-14.

Shneiderman, Ben, et al., "Network Visualization by Semantic Substrates," Visualization and Computer Graphics, vol. 12, No. 5, pp. 733,740, Sep.-Oct. 2006.

Thomas, R., "Bogon Dotted Decimal List," Version 7.0, Team Cymru NOC, Apr. 27, 2012, 5 pages.

Wang, Ru, et al., "Learning directed acyclic graphs via bootstarp aggregating," 2014, 47 pages, http://arxiv.org/abs/1406.2098.

Wang, Yongjun, et al., "A Network Gene-Based Framework for Detecting Advanced Persistent Threats," Nov. 2014, 7 pages.

Witze, Alexandra, "Special relativity aces time trial, 'Time dilation' predicted by Einstein confirmed by lithium ion experiment," Nature, Sep. 19, 2014, 3 pages.

Woodberg, Brad, "Snippet from Juniper SRX Series" Jun. 17, 2013, 1 page, O'Reilly Media, Inc.

Zatrochova, Zuzana, "Analysis and Testing of Distributed NoSQL Datastore Riak," Spring, 2015, 76 pages.

Zhang, Yue, et al., "CANTINA: A Content-Based Approach to Detecting Phishing Web Sites," May 8-12, 2007, pp. 639-648.

* cited by examiner

SYSTEM AND METHOD FOR NETWORK ROOT CAUSE ANALYSIS

The present technology pertains to a system and method of a multi-step analysis for determining a root cause of a performance problem and distinguishing between a root cause of a particular performance problem and factors correlated to the particular problem.

BACKGROUND

Existing analytics platforms such as The Cisco Tetration Analytics platform developed by Cisco Technology, Inc. of San Jose, Calif., capture and analyze real-time network traffic and application/process performance data from each endpoint and network device (including sensors, network components such as servers, etc.) in a network to assess network performance, security, policy compliance, etc. By correlating flow data and application/process data, additional insights can be obtained on application dependencies, performance, etc. When an issue occurs, existing analytics platforms may capture all the network traffic and application/process performance data from all over the network that occurs at a similar time. However, it is difficult to determine from all such collected network traffic and application/process data, the root cause of the network issue.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
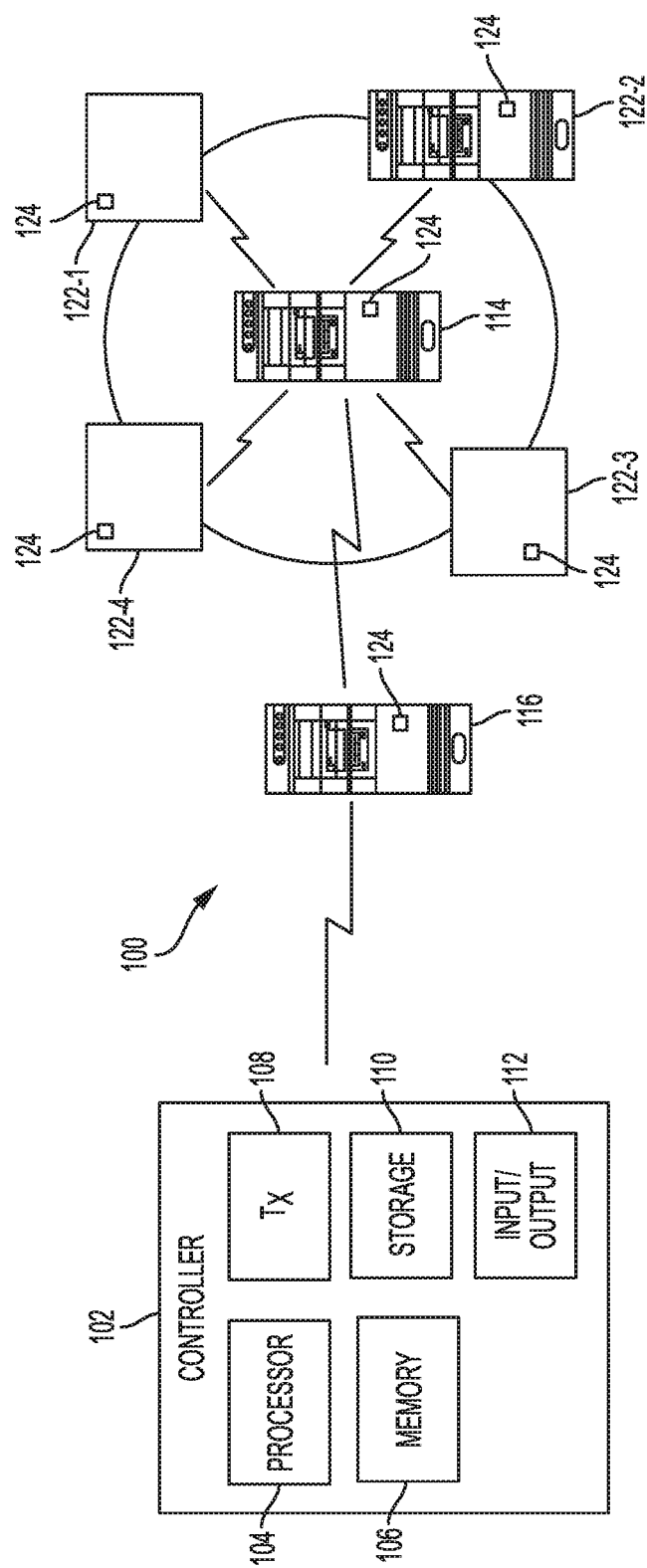
FIGS. 1A-D illustrate example network environments and architectures, according to one aspect of the present disclosure.

Various examples of the disclosure are discussed in detail below. While specific implementations are discussed, it should be understood that this is done for illustration purposes only. A person skilled in the relevant art will recognize that other components and configurations may be used without parting from the spirit and scope of the disclosure.

References to one or an example embodiment in the present disclosure can be, but not necessarily are, references to the same example embodiment; and, such references mean at least one of the example embodiments.

Reference to "one example embodiment" or "an example embodiment" means that a particular feature, structure, or characteristic described in connection with the example embodiment is included in at least one example of the disclosure. The appearances of the phrase "in one example embodiment" in various places in the specification are not necessarily all referring to the same example embodiment, nor are separate or alternative example embodiments mutually exclusive of other example embodiments. Moreover, various features are described which may be exhibited by some example embodiments and not by others. Similarly, various features are described which may be features for some example embodiments but not other example embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to limit the scope of the disclosure, examples of instruments, apparatus, methods and their related results according to examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled." to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular examples only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of examples. However, it will be understood by one of ordinary skill in the art that examples may be practiced without these specific details. For example, systems may be shown in block diagrams so as not to obscure the examples in unnecessary detail. In other instances, well-known processes, structures and techniques may be shown without unnecessary detail in order to avoid obscuring examples.

In the following description, illustrative examples will be described with reference to acts and symbolic representations of operations (e.g., in the form of flow charts, flow diagrams, data flow diagrams, structure diagrams, block diagrams, etc.) that may be implemented as program services or functional processes include routines, programs, objects, components, data structures, etc., that perform particular tasks or implement particular abstract data types and may be implemented using hardware at network elements. Non-limiting examples of such hardware may include one or more Central Processing Units (CPUs), digital signal processors (DSPs), application-specific-integrated-circuits, field programmable gate arrays (FPGAs), computers or the like.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

In one aspect of the present disclosure, a method includes receiving an inquiry to determine a root cause of a network problem and performing a multi-level process to determine the root cause, wherein a first level of the multi-level process includes, collecting data from one or more network components, generating a set of system metrics, each system metric of the set representing a portion of the data, at least one system metric of the set being a target metric corresponding to the network problem, ranking the set of system metrics based on a level of correlation of each system metric to the network problem to yield a ranked set of system metrics, and providing a visual representation of the network problem and each of the ranked set of system metrics. A second level of the multi-level process includes receiving an input identifying one or more of the ranked set of system metrics to be excluded from analysis and performing a conditional analysis for determining the root cause of the network problem using only ones of the set of system metrics that are not identified for exclusion.

In one aspect of the present disclosure, a system includes a memory having computer-readable instructions stored therein; and one or more processors. The one or more processors are configured to execute the computer-readable instructions to perform functions of receiving an inquiry to determine a root cause of a network problem and performing a multi-level process to determine the root cause, wherein a first level of the multi-level process includes collecting data from one or more network components, generating a set of system metrics, each system metric of the set representing a portion of the data, at least one system metric of the set being a target metric corresponding to the network problem, ranking the set of system metrics based on a level of correlation of each system metric to the network problem to yield a ranked set of system metrics and providing a visual representation of the network problem and each of the ranked set of system metrics. A second level of the multi-level process includes receiving an input identifying one or more of the ranked set of system metrics to be excluded from analysis and performing a conditional analysis for determining the root cause of the network problem using only ones of the set of system metrics that are not identified for exclusion.

In one aspect of the present disclosure, a non-transitory computer-readable medium has computer-readable instructions, which when executed by one or more processors, cause the one or more processors to perform the functions of functions of receiving an inquiry to determine a root cause of a network problem, perform a multi-level process in order to present a ranked list of a set of system metrics that are correlated to the network problem, the ranked list being presented in accordance with a level of corresponding relevance to the network problem, receive an input identifying one or more system metrics of the ranked list of system metrics to be excluded from further analysis of the root cause of the network problem, perform a conditional analysis of the network problem using only ones of the ranked list of the set of system metrics not identified for exclusion in the input and present a result of the conditional analysis.

DESCRIPTION OF EXAMPLE EMBODIMENTS

The disclosed technology addresses the need in the art for distinguishing factor(s) (system metric(s)) corresponding to a root cause of a particular network performance problem from all other factors (system metrics) that are simply correlated to the particular network performance problem. Hereinafter, a network performance problem may also be referred to as a network problem, a performance problem or simply a problem.

For example, a typical webserver application running on a cloud provided by a particular cloud service problem, can serve user requests. A corresponding network operator can monitor various network and server metrics including, but not limited to, a network bandwidth, TCP retransmissions. CPU usage of various servers used for the webserver application, memory usage by one or more processes of the network, etc. Typically such metrics can be grouped in feature families (e.g., an overall or a broader system metric) and each family can have hundreds of underlying metrics.

In this example, an assumption is made that the business goal of the application is monitored by measuring average user request latency. When the latency (an example of a network problem) goes up, the network operator would want to know what causes the increase in latency, and possibly how it can be mitigated/addressed.

Sometimes a metric or metrics is/are just correlated to the underlying problem but fail(s) to provide any insight about the root cause of the network problem, which in the above example is an increase in user request latency. Systems and methods are needed to distinguish between correlated factors (metrics) and root cause factors (metrics) of the network problem. For example, in the webserver application example above, as the user traffic increases, system memory usage also increases. This increase in memory usage is correlated to the user request latency, while the real cause is user traffic. One or more examples of the present disclosure, as described hereinafter, enable a relatively simple and more effective determination of system metrics to correlated to a network problem and taking feedback from network operators that simplify the process of determining causation of a network problem as opposed to simply the correlations between the network problem and other network performance metrics.

The disclosure begins with a description of example network environments and architectures which can be implemented for distributed streaming systems, as illustrated in FIGS. 1A-D.

The disclosure begins with a description of example network environments and architectures, as illustrated in FIGS. 1A-D.

FIG. 1A illustrates an example system, according to one aspect of the present disclosure. System (network) 100 of FIG. 1A includes a controller 102 and a distributed streaming system 120. Controller 102 can be an application, a software container, a virtual machine, a service chain, a virtual function(s), etc. Controller 102 can run on one or more devices or servers having components such as one or more processors (e.g., processor 104), one or more memories (e.g., memory 106), a transceiver 108, a display device 110 and an input device 112. Processor 104 can be configured to execute computer-readable instructions stored on memory 106 for performing the functionalities which will be described below with reference to FIGS. 4-5. Throughout the disclosure, controller 102 can be referred to as system management component 102, management device 102, device 102 and/or system controller 102.

Transceiver 108 can be any known or to be developed receiver and transmitter through which controller 102 can send and receive information to and from external components such as components of distributed streaming system 120.

Network operators and controllers (operational management component) can use display 110 to view data corresponding to status and/or management of operation of distributed streaming system 120, as will be described below. Display 110 can be any type of know or to be developed display such as a liquid crystal display (LCD), a light emitting diode display (LED), etc.

Input device 112 can be any known or to be developed input device including, but not limited to, a keyboard, a touch-based input device, etc. In one example, display 110 and input device 112 can be the same when display 110 is a touch enabled device capable of receiving inputs. Network managers and operators can provide appropriate commands for monitoring and management of distributed streaming system 120, via input device 112.

Controller 102 can communicate with various components of distributed streaming system 120 via any known or to be developed wireless communications and/or wired communications mean. For example, controller 102 can access and obtain information (and/or send information) to each component of distributed system 120 via a network such as a local area wireless network (LAN), a virtual local area network (vLAN) and/or any other type of, known or to be developed, network through which controller 102 can communicate with each component of distributed streaming system 120.

In one aspect, controller 102 can be any known or to be developed electronic device including, but not limited to, a laptop, a desktop computer, a mobile device, a handheld device, etc.

Distributed streaming system 120 can be any known, or to be developed, distributed streaming system where various components thereof such as components 122-1, 122-2, 122-3 and 122-4 communicate with one another to provide a streaming service to users in a distributed fashion. Hereinafter, components 122-1, 122-2, 122-3 and 122-4 may simply be referred to as components 122 or nodes 122. While throughout the present disclosure, distributed streaming system is provided as an example, the present disclosure is not limited thereto and can encompass and be applicable to any distributed systems that can be abstracted into a Directed Acyclic Graph (DAG) where each vertex can denote an information/message, and information/messages are passed through edges in certain directions. Other examples of distributed systems include a distributed sensor network where signals are propagated from sensor to sensor, a multi-component data processing system where each component receives and processes chunks of data and pass it to the next component(s).

Each one of components 122 can be any know or to be developed electronic device capable of communicating remotely with other devices such as other components 122. For example, each component 122 can be a mobile device, a laptop, a desktop computer, a switch, a data center comprising one or more servers, etc. For example, while some of components 122 can be end user devices or hosts, other ones of components 122 can be servers that facilitate the streaming services provided by distributed streaming system 120.

Furthermore, distributed streaming system 120 can have a server 114 acting as a collector of information (data) for other components (end user devices) in the system. Examples of data include device metrics such as device ID, an associated timestamp, device IP address, device throughput, device latency, memory and processing speed characteristics, etc.

In one example, system 100 further includes one or more feedback servers 116, where various types of data (to be used by controller 102) on components 122 can be collected and saved. In another example, system 100 does not include any feedback servers and instead can directly receive (through push or pull operations) the intended data (which will be described below) from each component 122.

Furthermore, FIG. 1A illustrates one or more sensors 124 associated with each network component 122 and feedback server 116. As will be described below, sensors 124 can be used by controller 102 for collecting various types of data such as component status, network performance, network traffic and application data for respective one of components 122 or feedback server 116.

While certain components are illustrated as part of system 100, system 100 is not limited thereto and may include any other type of component (e.g., additional servers, access points, sensors, etc.) for providing services to clients and end users.

Distributed streaming system 120 can be a cloud based system, where each component thereof is located in a different geographical location but can communicate with one another to form distributed streaming system 120 (e.g., over the Internet).

Examples of streaming services provided via distributed streaming system 120 can include, but is not limited to, live video and/or audio content such as a speech, a concert, a TV program, music, etc.

Operations of distributed streaming system 120 for delivering a streaming service to end users can be based on any know or to be developed method for doing so, by for example, continuously processing a stream of text, graphs, videos, audios, time series data, etc. in real time or near real time or periodically. The system 100 of FIG. 1A utilizes client/server based architectures. In other examples, system 100 can be implemented as a cloud or fog computing architecture.

Figure 1B:
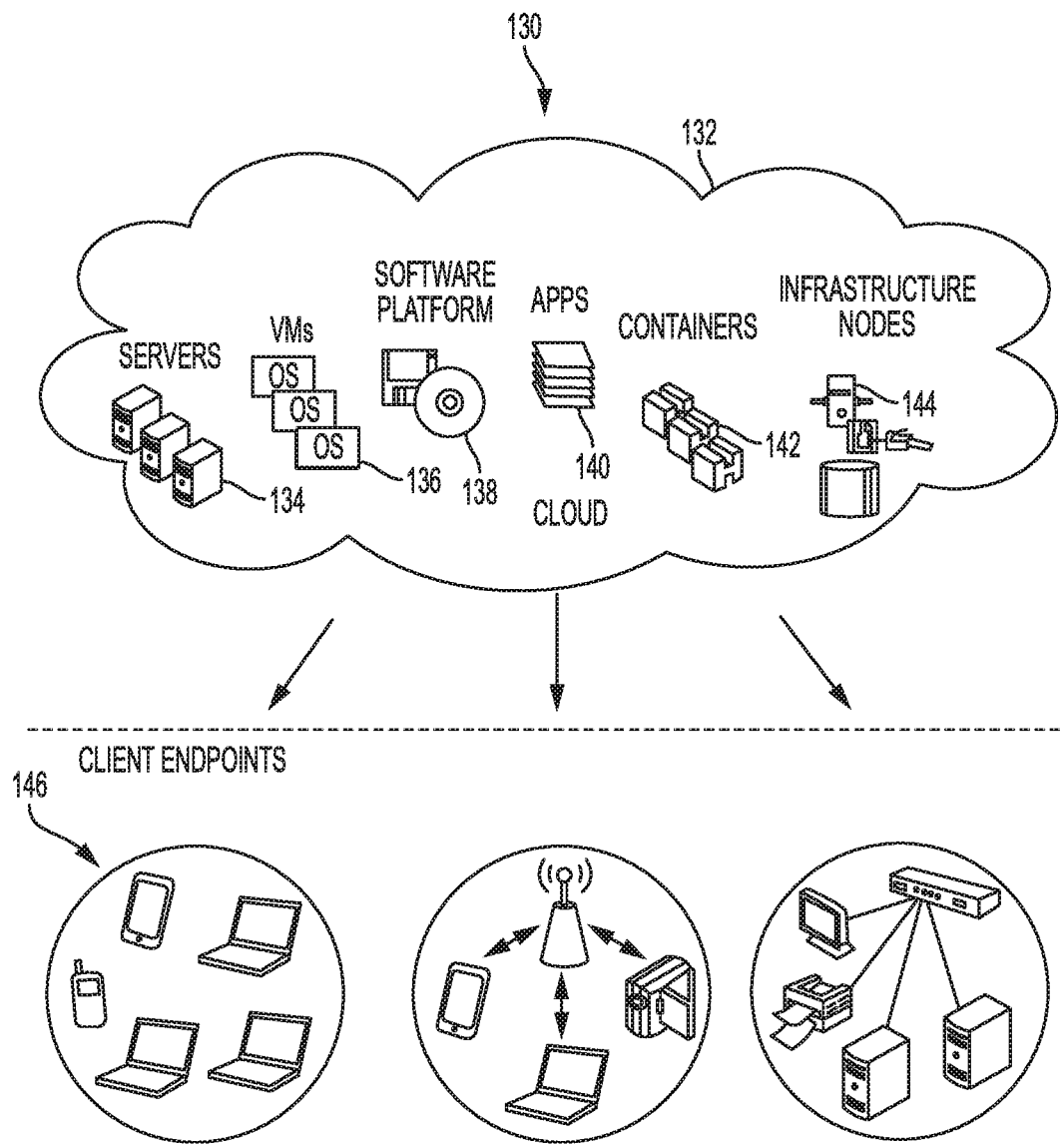

FIG. 1B illustrates a diagram of an example cloud computing architecture (network) 130. The architecture can include a cloud 132. The cloud 132 can include one or more private clouds, public clouds, and/or hybrid clouds. Moreover, the cloud 132 can include cloud elements 134-144. The cloud elements 134-144 can include, for example, servers 134, virtual machines (VMs) 136, one or more software platforms 138, applications or services 140, software containers 142, and infrastructure nodes 144. The infrastructure nodes 144 can include various types of nodes, such as compute nodes, storage nodes, network nodes, management systems, etc. In one example, one or more servers 134 can implement the functionalities of controller 102, which will be described below. Alternatively, controller 102 can be a separate component that communicates with components of the cloud computing architecture 130 that function as a distributed streaming system similar to the distributed streamlining system 120.

The cloud 132 can provide various cloud computing services via the cloud elements 134-144, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), function as a service (FaaS), and other types of services such as desktop as a service (DaaS), information technology management as a service (ITaaS), managed software as a service (MSaaS), mobile backend as a service (MBaaS), etc.

The client endpoints 146 can connect with the cloud 132 to obtain one or more specific services from the cloud 132. The client endpoints 146 can communicate with elements 134-144 via one or more public networks (e.g., Internet), private networks, and/or hybrid networks (e.g., virtual private network). The client endpoints 146 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1C:
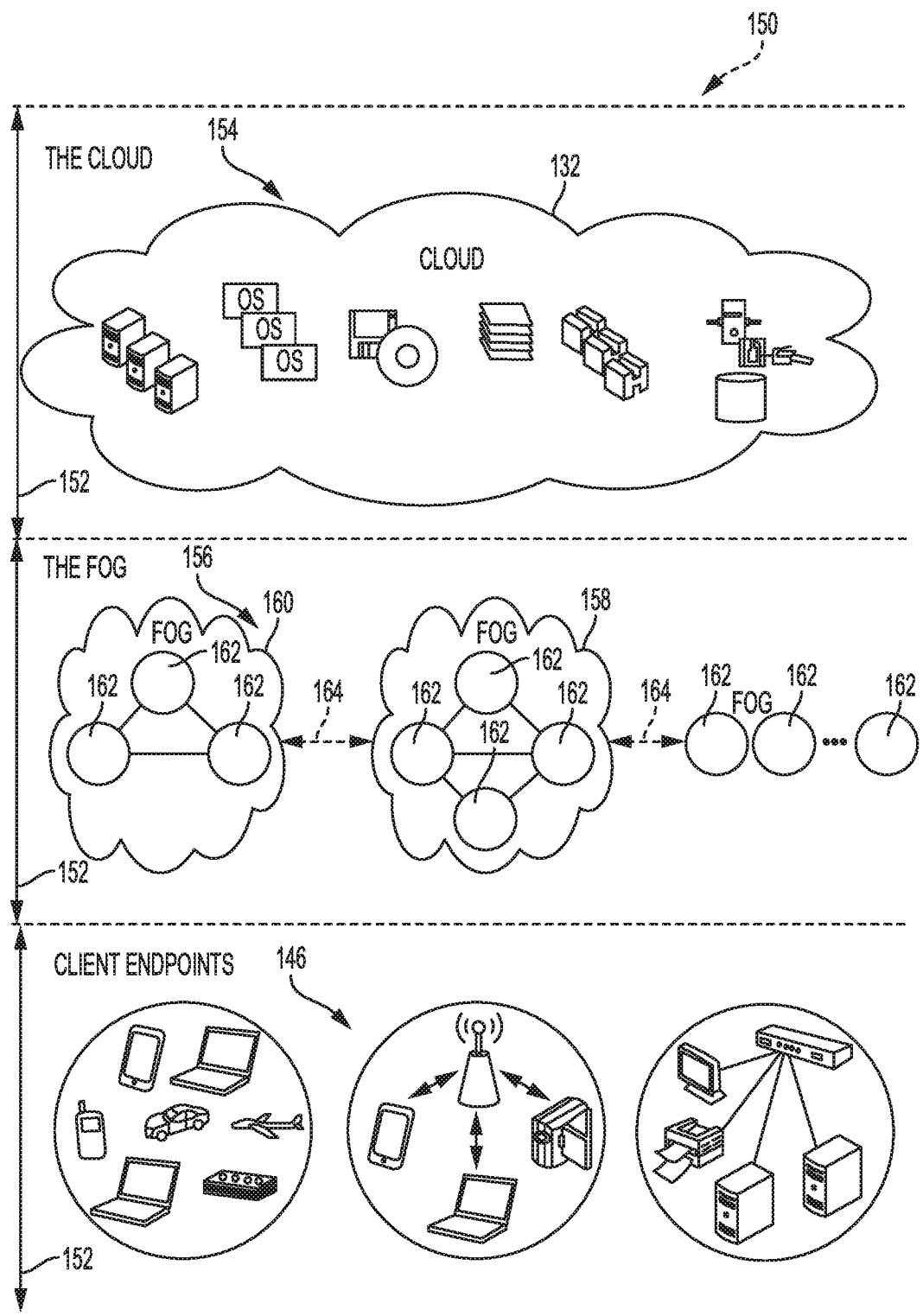

FIG. 1C illustrates a diagram of an example fog computing architecture (network) 150. The fog computing architecture 150 can include the cloud layer 154, which includes the cloud 132 and any other cloud system or environment, and the fog layer 156, which includes fog nodes 162. The client endpoints 146 can communicate with the cloud layer 154 and/or the fog layer 156. The architecture 150 can include one or more communication links 152 between the cloud layer 154, the fog layer 156, and the client endpoints 146. Communications can flow up to the cloud layer 154 and/or down to the client endpoints 146.

In one example, one or more servers 134 can implement the functionalities of controller 102, which will be described below. Alternatively, controller 102 can be a separate component that communicates with components of the fog computing architecture 150 that function as a distributed streaming system similar to the distributed streamlining system 120

The fog layer 156 or "the fog" provides the computation, storage and networking capabilities of traditional cloud networks, but closer to the endpoints. The fog can thus extend the cloud 132 to be closer to the client endpoints 146. The fog nodes 162 can be the physical implementation of fog networks. Moreover, the fog nodes 162 can provide local or regional services and/or connectivity to the client endpoints 146. As a result, traffic and/or data can be offloaded from the cloud 132 to the fog layer 156 (e.g., via fog nodes 162). The fog layer 156 can thus provide faster services and/or connectivity to the client endpoints 146, with lower latency, as well as other advantages such as security benefits from keeping the data inside the local or regional network(s).

The fog nodes 162 can include any networked computing devices, such as servers, switches, routers, controllers, cameras, access points, kiosks, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 146. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 1D:
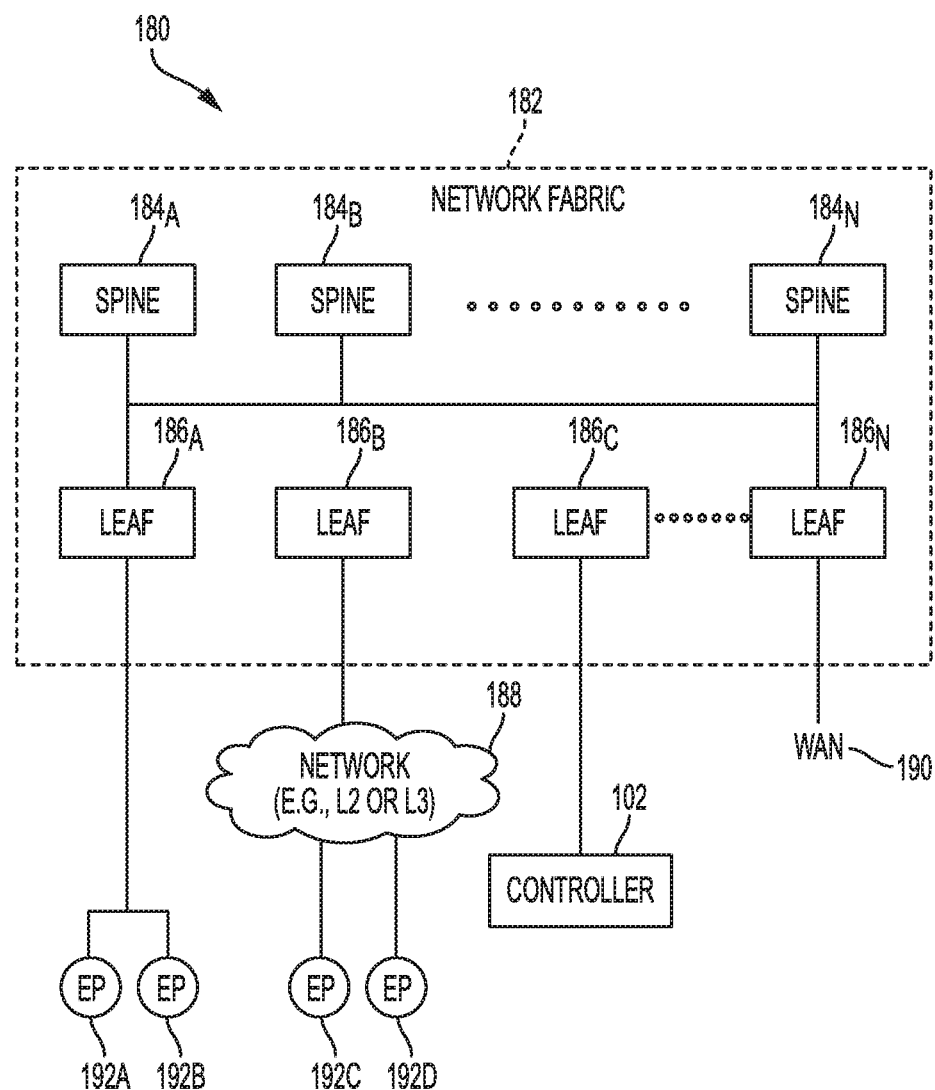

FIG. 1D illustrates a schematic block diagram of an example network architecture (network) 180. In some cases, the architecture 180 can include a data center, which can support and/or host the cloud 132. Moreover, the architecture 180 includes a network fabric 182 with spines 184A, 184B, . . . , 184N (collectively "184") connected to leafs 186A, 186B, 186C, . . . , 186N (collectively "186") in the network fabric 182. Spines 184 and leafs 186 can be Layer 2 and/or Layer 3 devices, such as switches or routers. For the sake of clarity, they will be referenced herein as spine switches 184 and leaf switches 186.

Spine switches 184 connect to leaf switches 186 in the fabric 182. Leaf switches 186 can include access ports (or non-fabric ports) and fabric ports. Fabric ports can provide uplinks to the spine switches 182, while access ports can provide connectivity for devices, hosts, endpoints. VMs, or external networks to the fabric 182.

Leaf switches 186 can reside at the boundary between the fabric 182 and the tenant or customer space. The leaf switches 186 can route and/or bridge the tenant packets and apply network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 186 can contain virtual switching and/or tunneling functionalities, such as a virtual tunnel endpoint (VTEP) function. Thus, leaf switches 186 can connect the fabric 182 to an overlay (e.g., VXLAN network).

Network connectivity in the fabric 182 can flow through the leaf switches 186. The leaf switches 186 can provide servers, resources, endpoints, external networks, containers, or VMs access to the fabric 182, and can connect the leaf switches 186 to each other. The leaf switches 186 can connect applications and/or endpoint groups ("EPGs") to other resources inside or outside of the fabric 182 as well as any external networks.

Endpoints 192A-D (collectively "192") can connect to the fabric 182 via leaf switches 186. For example, endpoints 192A and 192B can connect directly to leaf switch 186A, which can connect endpoints 192A and 192B to the fabric 182 and/or any other of the leaf switches 186. Similarly, controller 102 (which can be the same as controller 102 described above with reference to FIG. 1A) can connect directly to leaf switch 186C, which can connect controller 102 to the fabric 182 and/or any other of the leaf switches 186. On the other hand, endpoints 192C and 192D can connect to leaf switch 186A and 186B via network 188. Moreover, the wide area network (WAN) 190 can connect to the leaf switches 186N.

Endpoints 192 can include any communication device or resource, such as a computer, a server, a cluster, a switch, a container, a VM, a virtual application, etc. In some cases, the endpoints 192 can include a server or switch configured with a virtual tunnel endpoint functionality which connects an overlay network with the fabric 182. For example, in some cases, the endpoints 192 can represent hosts (e.g., servers) with virtual tunnel endpoint capabilities, and running virtual environments (e.g., hypervisor, virtual machine(s), containers, etc.). An overlay network associated with the endpoints 192 can host physical devices, such as servers; applications; EPGs; virtual segments; virtual workloads; etc. Likewise, endpoints 192 can also host virtual workloads and applications, which can connect with the fabric 182 or any other device or network, including an external network.

Figure 2:
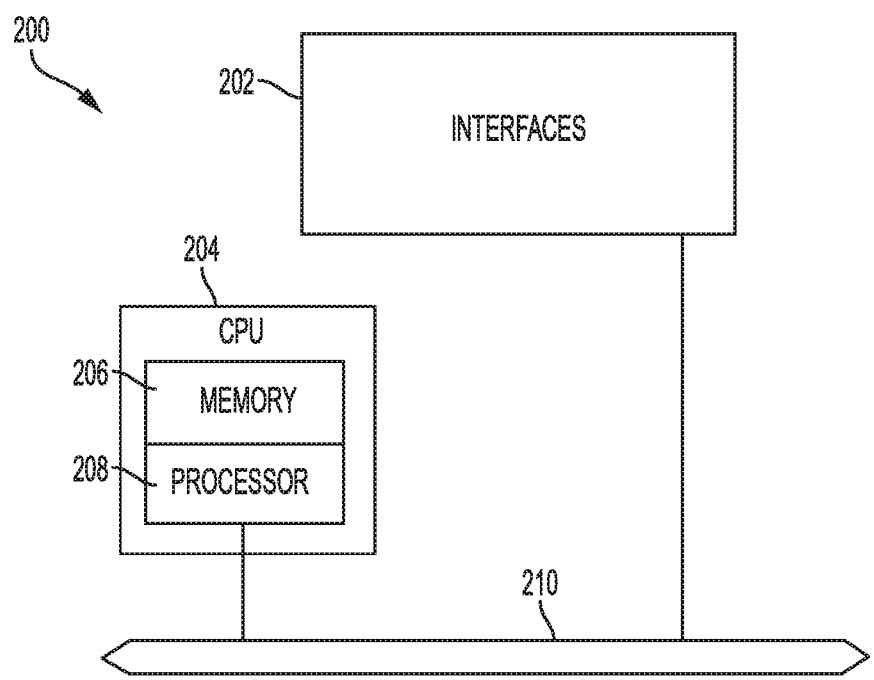
FIG. 2 illustrates an example network device suitable for performing switching, routing, load balancing, and other networking operations, according to an aspect of the present disclosure.
Figure 3:
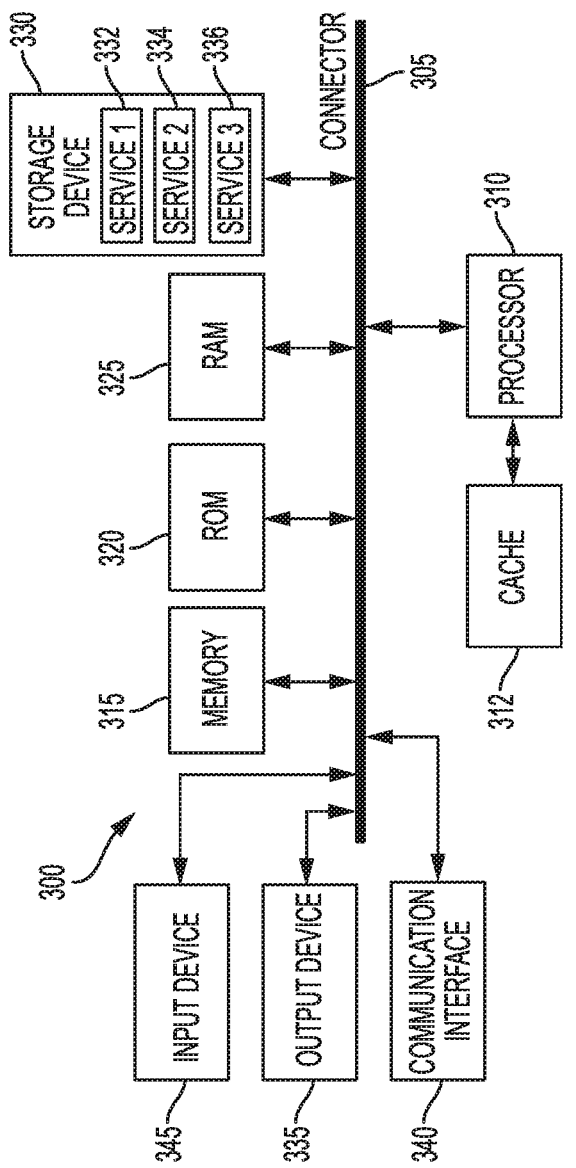
FIG. 3 illustrates a computing system architecture, according to an aspect of the present disclosure.

The disclosure now turns to FIGS. 2 and 3, which illustrate example network devices and computing devices, such as switches, routers, load balancers, client devices, and so forth.

FIG. 2 illustrates an example network device suitable for performing switching, routing, load balancing, and other networking operations, according to an aspect of the present disclosure. In one example, network device 200 can be controller 102 and/or any one of components 122 of FIG. 1A. Network device 200 includes a central processing unit (CPU) 204, interfaces 202, and a bus 210 (e.g., a PCI bus). When acting under the control of appropriate software or firmware, CPU 204 is responsible for executing packet management, error detection, and/or routing functions. CPU 204 preferably accomplishes all these functions under the control of software including an operating system and any appropriate applications software. CPU 204 may include one or more processors 208, such as a processor from the INTEL X86 family of microprocessors. In some cases, processor 208 can be specially designed hardware for controlling the operations of network device 200. In some cases, a memory 206 (e.g., non-volatile RAM, ROM, etc.) also forms part of CPU 204. However, there are many different ways in which memory could be coupled to the system.

Interfaces 202 are typically provided as modular interface cards (sometimes referred to as "line cards"). Generally, they control the sending and receiving of data packets over the network and sometimes support other peripherals used with network device 200. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces. Gigabit Ethernet interfaces. ATM interfaces. HSSI interfaces, POS interfaces. FDDI interfaces. WIFI interfaces, 3G/4G/5G cellular interfaces. CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 204 to efficiently perform routing computations, network diagnostics, security functions, etc.

Although the system shown in FIG. 2 is one specific network device of the present invention, it is by no means the only network device architecture on which the present invention can be implemented. For example, an architecture having a single processor that handles communications as well as routing computations, etc., is often used. Further, other types of interfaces and media could also be used with network device 200.

Regardless of the network device's configuration, it may employ one or more memories or memory modules (including memory 206) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 206 could also hold various software containers and virtualized execution environments and data.

Network device 200 can also include an application-specific integrated circuit (ASIC), which can be configured to perform routing and/or switching operations. The ASIC can communicate with other components in network device 200 via bus 210, to exchange data and signals and coordinate various types of operations by network device 200, such as routing, switching, and/or data storage operations, for example.

FIG. 3 illustrates a computing system architecture, according to an aspect of the present disclosure. As shown in FIG. 3, components of system 300 are in electrical communication with each other using a connection 305, such as a bus. Exemplary system 300 includes a processing unit (CPU or processor) 310 and a system connection 305 that couples various system components including system memory 315, such as read only memory (ROM) 320 and random access memory (RAM) 325, to processor 710. System 300 can include a cache of high-speed memory connected directly with, in close proximity to, or integrated as part of the processor 310. System 300 can copy data from memory 315 and/or storage device 330 to cache 312 for quick access by processor 310. In this way, the cache can provide a performance boost that avoids processor 310 delays while waiting for data. These and other modules can control or be configured to control the processor 310 to perform various actions. Other system memory 315 may be available for use as well. Memory 315 can include multiple different types of memory with different performance characteristics. Processor 310 can include any general purpose processor and a hardware or software service, such as Service 1 332, Service 2 334, and Service 3 336 stored in storage device 330, configured to control processor 310 as well as a special-purpose processor where software instructions are incorporated into the actual processor design. Processor 310 may be a completely self-contained computing system, containing multiple cores or processors, a bus, memory controller, cache, etc. A multi-core processor may be symmetric or asymmetric.

To enable user interaction with the computing device 300, an input device 345 can represent any number of input mechanisms, such as a microphone for speech, a touch-sensitive screen for gesture or graphical input, keyboard, mouse, motion input, speech and so forth. An output device 335 can also be one or more of a number of output mechanisms known to those of skill in the art. In some instances, multimodal systems can enable a user to provide multiple types of input to communicate with computing device 300. The communications interface 340 can generally govern and manage the user input and system output. There is no restriction on operating on any particular hardware arrangement and therefore the basic features here may easily be substituted for improved hardware or firmware arrangements as they are developed.

Storage device 330 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 325, read only memory (ROM) 320, and hybrids thereof.

The storage device 330 can include services 332, 334, 336 for controlling the processor 310. Other hardware or software modules are contemplated. The storage device 330 can be connected to the system connection 305. In one aspect, a hardware module that performs a particular function can include the software component stored in a computer-readable medium in connection with the necessary hardware components, such as the processor 310, connection 305, output device 335, and so forth, to carry out the function.

Hereinafter, a process for determining a root cause of a network problem is described with reference to FIGS. 4 and 5.

Figure 4:
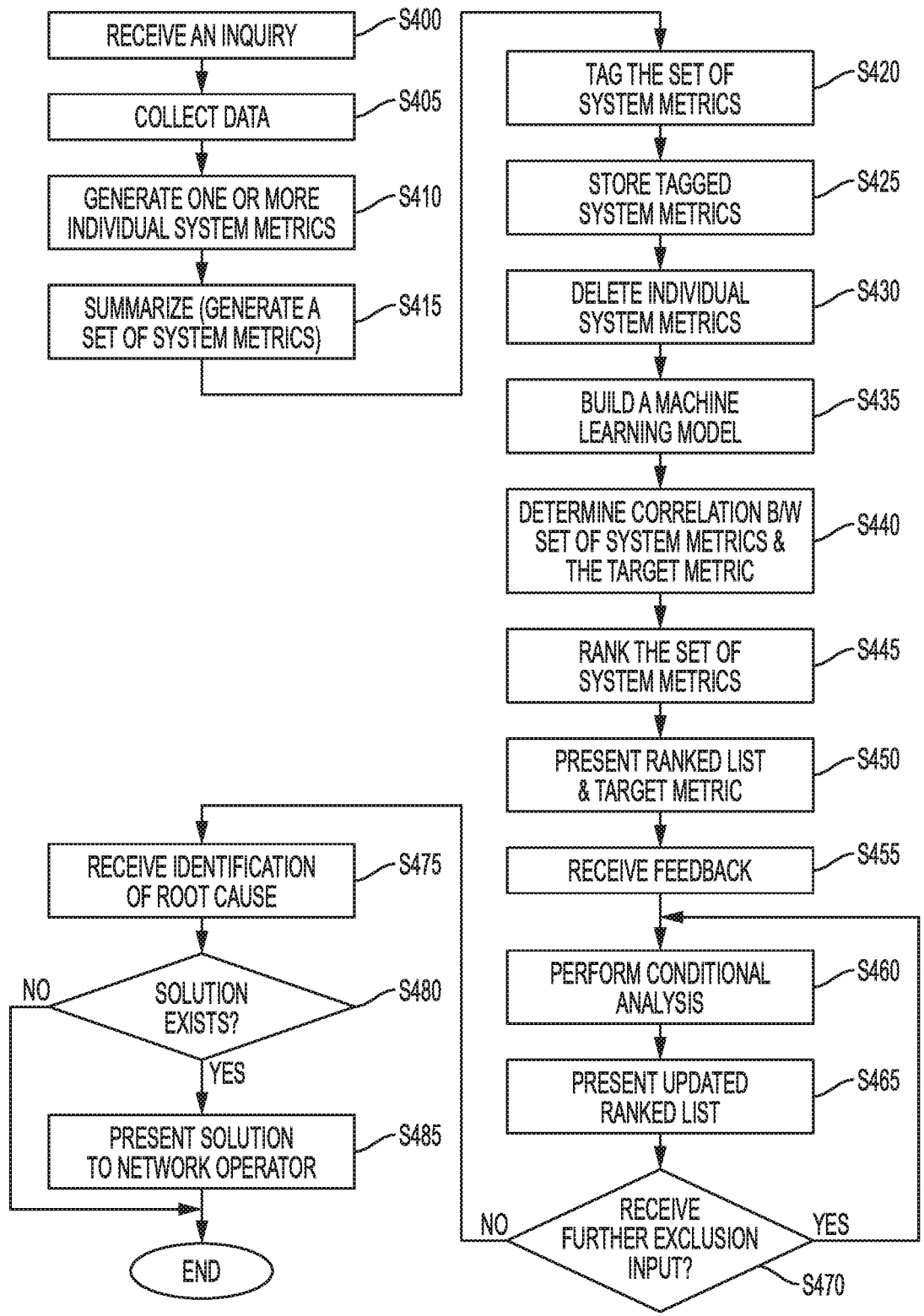
FIG. 4 illustrates a method of determining a root cause of a network problem, according to one aspect of the present disclosure.

FIG. 4 illustrates a method of determining a root cause of a network problem, according to one aspect of the present disclosure. FIG. 4 will be described from the perspective of controller (system management component) 102 of FIG. 1A. However, it will be appreciated that one or more processors of controller 102 such as processor 104 execute computer-readable instructions stored on one or more memories such as memory 106 to transform the one or more processors into special purpose processor(s) for carrying out the functionalities and the process of FIG. 4.

At S400, controller 102 receives an inquiry. In one example, controller 102 receives the inquiry from a network operator. The inquiry may identify one or more network problems the root cause of which is to be determined by controller 102. For example, an inquiry received at S400 can be a request to determine a root cause of user request latency mentioned above.

At S405, controller 102 collects various types of data related to network 100, cloud architecture 130, 150, etc. As indicated above, controller 102 can collect the data using, for example, sensors 124 shown in FIG. 1. As also indicated above, the collected data can be any type of network data including, but not limited to, network traffic data (e.g., bytes sent, packets sent, TCP ACKs, etc.), network component performance data (e.g., CPU load or disk usage by one or more servers operating in a production mode such as servers 134, VMs 136, etc. of cloud 132, CPU load or disk usage by one or more servers in a development/testing mode such as servers 134, VMs 136, etc. of cloud 132), application performance data or application dependencies of applications/processes such as that of applications 140 running on cloud 132, etc.

At S410, controller 102 generates one or more system metrics into each of which a portion of the data collected at S405 are organized. For example, bytes sent are organized into one metric. TCP ACKs are organized into another metric, CPU usage is organized into another metric, etc. In one example, each metric can have a tag (identifier) associated therewith. In another example, each metric is a time-series metric. Each element can also have a tag in the form of (key, value), where key indicates what the attribute is (e.g., TCP ACKs, CPU usage, etc.) and the value indicates the attribute's value at a particular time.

The one or more system metrics generated at S410 can be referred to as individual system metrics In a real-world example, a network such as network 100 or 130 can have hundreds or thousands of different components and applications/processes running thereon. Therefore, a number of metrics into which collected data are organized can be in the thousands. Therefore, analyzing and understanding from all of these metrics, what a particular network problem may be is a resource intensive and time consuming process, if not impossible.

In one example, one or more of the individual system metrics created at S410 into which collected data are organized is referred to as a target metric(s). A target metric can represent data related to the target network problem, the root cause of which is to be identified. In examples described above, a target metric can be a time series of data collected on user request latency by controller 102.

At S415, controller 102 summarizes the generated individual system metrics, based on one or more common characteristics therebetween, into a set of metrics (i.e., generates a set of system metrics). This may be referred to as summarizing two or more metrics in an umbrella metric. As mentioned above, in a real-world example, a number of metrics into which collected data are organized can be in the thousands, the analysis of which is difficult and resource intensive, if not impossible. Therefore, by summarizing the generated metrics based on common characteristics a few to a hundred of different metrics can be combined into a single umbrella metric by controller 102 at S415.

For example, a common characteristic between metrics on bytes sent, packets sent and, TCP ACKs is network usage. Therefore, all three metrics on bytes sent, packets sent and TCP ACKs are summarized into a single network usage metric at S415.

In one example and in order to summarize two or more of the individual system metrics into an umbrella metric, controller 102 can use dimensionality reduction techniques including, but not limited to, the principle component analysis. Furthermore, controller 102 can use other techniques such as factor analysis in order to detect and collect latent/hidden features and deep learning auto encoders.

Use of techniques such as factor analysis to detect latent features and anomalies is useful because solely relying on summary features can lead to losing important data. For example, if packet counts and byte counts are summarized into a single network usage metrics, we risk losing unusual network data such as, for example, a more than typical number of small packets transmitted during certain time-period (which by itself can cause problems or can contribute to the network problem that controller 102 is to find the root cause of).

Accordingly, implementing factor analysis can result in tracking and saving such anomalies.

In one or more examples, two or more of the individual system metrics that are summarized into a single umbrella metric according to one or more corresponding common characteristics can have weights added thereto. In other words, the single umbrella can include a weighted combination of the metrics summarized into. In one example, the weight can be determined by controller 102, depending on the relevancy and/or importance of the corresponding metric. For example, number of packets sent may be less important to the user request latency that number of bytes sent. Accordingly, a higher weight can be associated with the number of bytes metric than the number of packets metric.

At S420, controller 102 tags each of the set of system metrics (summarized metrics at S415). Summarizing at S415 can sometimes results in losing labels (identifiers) of underlying metrics that are summarized into one umbrella metric, thus making it more difficult controller 102 and/or network operations of network 100/130 to understand what a particular umbrella metric conveys. For example, an umbrella metric that is a summarized version of metrics representing packets sent, bytes sent and TCP ACKs can lose their identifiers and thus be unnamed. Accordingly, at S420, controller 102 can automatically generate a tag for the umbrella metric based on a common description associated with identifiers of the metrics representing bytes sent, packets sent and TCP ACKs (e.g., generate a "Network Usage" tag based on "Bytes", "Packets" and "TCP ACKs" identifiers of metrics representing packets sent, bytes sent and TCP ACKs, respectively).

In another example, metrics generated at S410 can correspond to application/process data of an application running on several servers in network 100 or network 130. Each process on one of the servers can have a corresponding process ID. Accordingly and after summarizing individual server data for the application running thereon, the summarized metric can be tagged with the process ID at S420.

In one example, instead of generating the tag automatically, controller 102 prompts a network operator to provide an appropriate tag for a particular umbrella metric. In one example, controller 102 can request the network operator for the tag if, for example, controller 102 is unable to automatically generate a tag or if setting are provided prohibiting controller 102 from automatically generating a tag for an umbrella metric.

At S425, controller 102 stores the tagged and summarized metrics in an associated memory (e.g., one or more memory or disks in network 100 or network 130).

At S430, controller 102 deletes individual system metrics based on which summarized umbrella metrics (the set of system metrics) are generated at S415. In one example, controller 102 only deletes a subset of metrics generated at S415. For example, controller 102 can receive input/feedback as to which metrics to store and which metrics to delete. In another example, controller 102 deletes old/individual metrics after a certain amount of time has passed from generation thereof, where the certain amount of time is a configurable parameter determined based on experiments and/or empirical studies.

At S435, controller 102 builds a machine learning model based on the tagged and summarized set of system metrics. Any known or to be developed machine learning algorithm can be used for training the model. In one example, the tagged and summarized metrics (tagged umbrella metrics) are fed into the machine learning algorithm for building a model.

At S440, controller 102 uses the machine learning model to determine a correlation between each summarized and tagged metric of the set of system metrics at S420 and the target metric.

At S445 and based on the determined relevancy and correlation, controller 102 ranks the summarized system metrics (the set of system metrics). In one example, the ranking results in arranging the summarized metrics in an order of relevancy thereof to the target metric that represents the network problem. The machine learning model, once trained using collected data, can determine correlation between various summarized and tagged metrics and the target metric by using methods including, but not limited to, cross validation and regression techniques.

In one example the processes of S400 to S445 can be referred to as a first step (first level) of a multi-step (multi-level) process for determining a root cause of a network problem. S450 to S485, as will be described below, can be referred to as a second step (second level) of the multi-step (multi-level) process for determining the root cause of the network problem.

At S450, controller 102 presents to the network operator a visual representation of the target metric and the ranked list of correlated summarized and tagged system metrics. In one example, the visual representation of the target metric and each correlated system metric is a time-series representation (e.g., a time-dependent graph) of the corresponding one of the target metric and each correlated metric.

At S455, controller 102 receives a feedback from the network operator indicating that one or more of the metrics correlated to the target metric is/are to be excluded from a second step of the multi-steps analysis for determining the root cause of the network problem. The one or more correlated system metrics identified for exclusion can be, for example, metrics that explain variations in a time series representation of the target metric except for one or more time instances during which the target metric exhibits unconventional/different/unique characteristics and behavior relevant to the all other times. This will be further described with respect to an example in FIG. 5.

At S460, controller 102 performs a second step of the multi-step analysis using only ones of the correlated metrics not identified for exclusion by the network operator at S455. This second step of the multi-step analysis can be referred to as a conditional analysis. For example, at S455, controller 102 can receive input for excluding CPU usage metric from the analysis for determining root cause of user request latency. Accordingly, at S460 and in performing the second step of the multi-step analysis, controller 102 excludes CPU usage metric from the analysis.

The conditional analysis performed at S460, similar to the first step at S440, is based on the machine learning model with the only exception that one or more metrics identified at S455 are now excluded. With remaining correlated metrics used as inputs into the model, controller 102 now determines an updated ranked list of correlated metrics that can explain the root cause of the network problem.

At S465, controller 102 presents the updated ranked list (i.e., results of the condition analysis of S460) to the network problem. Similar to S450, the result of the conditional analysis is presented as a time series of the target metric and a ranked list of each remaining correlated metric.

At S470, controller 102 determines if further exclusion inputs (similar to the input received at S455) are received from the network operator.

If at S470, controller 102 determines that no further input is received from the network operator, then at S475, controller 102 receives an input from the network operator designating one of the presented ranked list of correlated metrics at S465 as the root cause of the network problem. This input at S475 can either be provided by a network operator or can be a confirmation of a root cause determined by controller 102 and present to a network operator for confirmation.

Thereafter, at S480, controller 102 determines if a particular solution for addressing the network problem exists in a database. This can be for example, based on previous solutions presented (implemented) by the network operator for addressing similar network problems in the past.

If a particular solution exists at S480, then at S485, controller 102 presents the solution to the network operator. Otherwise, the process ends. In one example, appropriate actions can be taken to address/eliminate the network problem. For example, if the network problem is user request latency, in one example, additional processing capabilities may be utilized (brought online) to enable an efficient and timely service of user requests according to service level agreements (SLAs), etc.

Referring back to S470, if at S470 controller 102 determines that further inputs for excluding further correlated metrics are received, the process reverts back to S460 and controller 102 repeats S460 to S470.

In another example, there may be a further input after S485 at which the network operator provides instructions to controller 102 to address the root cause of the network problem. In one example, controller 102 addressed the network problem according to the received instructions. For example, the instructions for addressing latency in user requests can be to add additional resources (e.g., bring more processors online, utilize additional containers, etc.) to the network to enable an efficient and timely service of user requests according to service level agreements (SLAs), etc.

In one example, processes at S480 and S485 are optional and may be skipped or not performed at all. Accordingly, the process ends S475.

Figure 5:
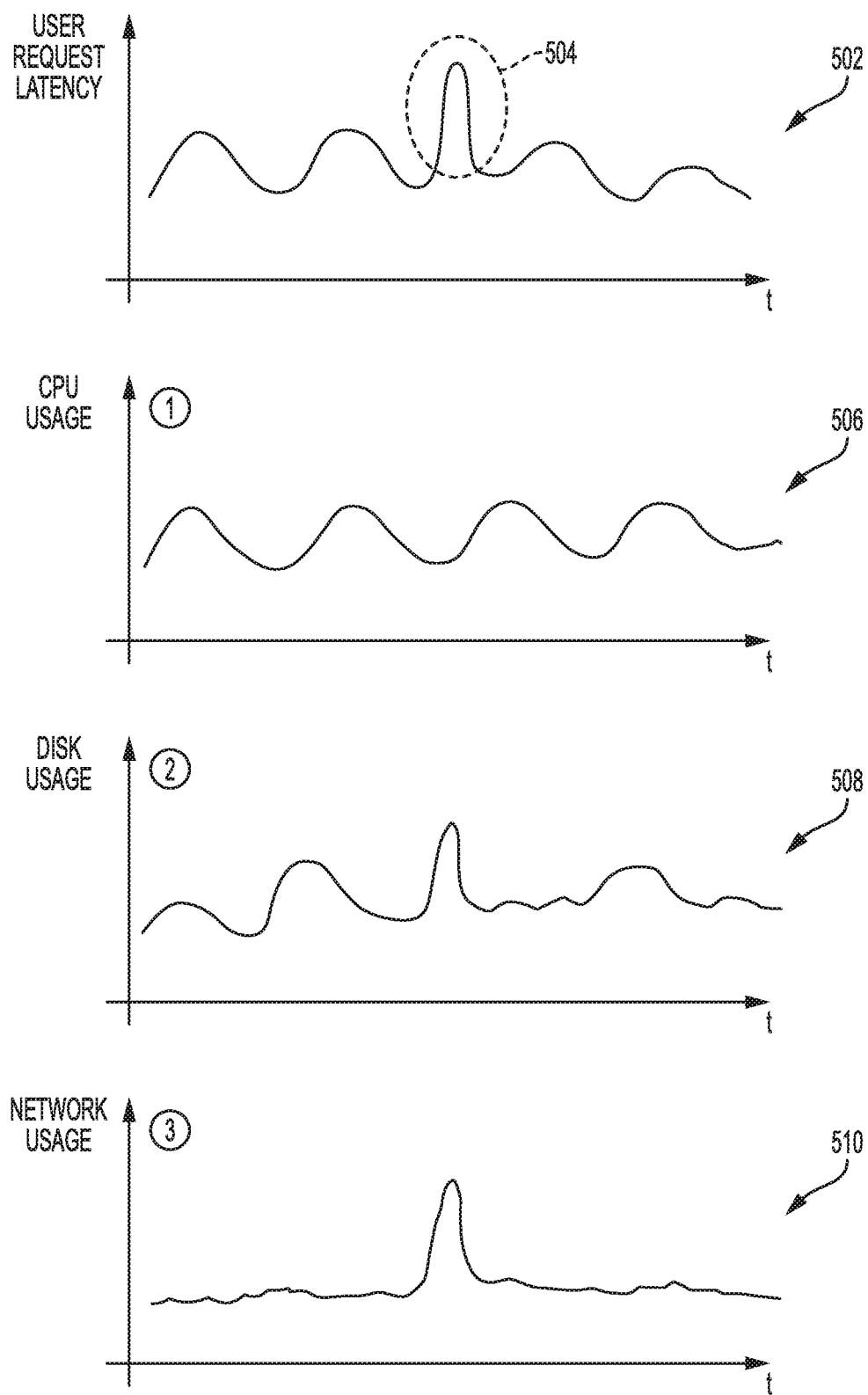
FIG. 5 illustrates an example of the process of FIG. 4, according to an aspect of the present disclosure.

FIG. 5 illustrates an example of the process of FIG. 4, according to an aspect of the present disclosure.

FIG. 5 illustrates an example in which an inquiry (at S400) is received for determining a root cause of user request latency. Upon performing the process of S400 to S445 (i.e., the first step/level of the multi-step/multi-level process for determining a root cause of the user request latency, at S450, controller 102 displays a visual representation of four system metrics on a display. Graph 502 is an example time-series representation of user request latency metric. As shown in graph 502, there is a spike 504 in this time-series representation, which indicated an unusual behavior/unexpected increase of latency in user requests/queries.

Furthermore, FIG. 5 illustrates examples of three other system metrics that are correlated to the user request latency. One graph is graph 506, which is an example of time-series representation of CPU usage metric. Another graph is graph 508, which is an example of time-series representation of disk usage metric. Another graph is graph 510, which is an example of time-series representation of network usage metric. In one example, graph 510 is a representation of summarized metric of network usage determined at S430 based on metrics of bytes sent, packets sent, TCP ACKs, etc., as described above.

While in example of FIG. 5, a particular network problem is illustrated with only three correlated metrics, inventive concepts are not limited thereto. For example, there can be more or less correlated metrics associated with a network problem.

In one example, the presentation of graphs 506, 508 and 510 are in order of relevancy (correlation) thereof to the user request latency. As can be seen from FIG. 5, graph 506 of CPU usage closely follows the behavior of user request latency of graph 502 except at or near the spike 504. At the same time, graph 508 does not follow the behavior of user request latency of graph 504 as closely as graph 506 does but more closely follows graph 502 at or near the spike 504. Furthermore, graph 510 does not follow/match the behavior of graph 502, except at or near spoke 504. Accordingly, controller 102, by using the machine learning model developed at S435, ranks graph 506 higher than graph 508 and ranks graph 508 higher than graph 510. Accordingly, at S450, controller 102 present graphs 506, 508 and 510 in the ranked order of 1, 2 and 3 as shown in FIG. 5.

By observing graphs 502, 506, 508 and 510, network operator can determine that, while correlated, CPU usage of graph 506 is the least possible root cause of the user request latency because the behavior CPU usage of graph 506 at or near spike 504 is not correlated (does not follow) to the behavior of user request latency of graph 502.

Accordingly, at S455, controller 102 receives a feedback from the network operator to exclude graph 502 and corresponding CPU usage metric from further analysis (step/level two of the multi-step/multi-level process) for determining the root cause of user request latency.

Thereafter, controller 102 performs a conditional analysis of the root cause of user request latency based on disk usage and network usage system metrics (graphs 508 and 510) only and presents the result thereof to the network operator at S465. Thereafter, S470 to S485 are implemented until a root cause of the user request latency (e.g., either disk usage or network usage in the example of FIG. 5) is identified and proposals for addressing the network problem (if available)

are presented to the network operator at S485 or in the alternative the network operator takes active steps to address the network problem.

Examples described above with reference to the accompanying figures provide an improvement to an analytics platform designed to monitor and identify root causes of various problems that can occur in a network of computer systems. This improved analytical platform improves the state of networked service platforms that provide various types of services including, but not limited to, Infrastructure as a Service (IaaS), Software as a Service (SaaS) and Platform as a Service (PaaS) to their clients. By improving the efficiency of detecting and addressing various types of network component problems and application/service problems in the network using the example systems disclosed herein (as opposed to simply identifying correlated factors and metrics), the overall efficiency of the network and performance of its components can dramatically increase, since now problems are identified and addressed more quickly than is currently done by available analytics platforms.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   receiving an inquiry to determine a root cause of a network problem; and
   performing a multi-level process to determine the root cause, wherein
   a first level of the multi-level process includes,
      collecting data from one or more network components;
      generating a set of system metrics, each system metric of the set representing a portion of the data, at least one system metric of the set being a target metric corresponding to the network problem;
      ranking the set of system metrics based on a level of correlation of each system metric to the network problem to yield a ranked set of system metrics; and
      providing a visual representation of the network problem and each of the ranked set of system metrics; and
   a second level of the multi-level process includes,
      receiving an input identifying one or more of the highest ranked system metrics of the set of system metrics to be excluded from analysis; and
      performing a conditional analysis for determining the root cause of the network problem using only ones of the set of system metrics that are not identified for exclusion.

2. The method of claim 1, wherein ranking the set of system metrics is performed by using a machine learning model in conjunction with a cross validation or regression technique to determine a correlation level of each one of the set of system metrics to the target metric.

3. The method of claim 1, wherein the generating the set of system metrics includes
   grouping the data into one or more sets;
   analyzing the one or more sets to identify one or more common characteristics between two or more of the sets; and
   combining the two or more sets into a single system metric of the set of system metrics.

4. The method of claim 3, further comprising:
   tagging each system metric of the set, the tag being an identifier of underlying data being represented in each system metric.

5. The method of claim 1, wherein each system metric of the set is a time series representation of corresponding data in the same set.

6. The method of claim 1, further comprising:
presenting a result of the conditional analysis on a display, the result identifying the root cause.

7. The method of claim 1, wherein the data in each of the set of system metrics include one or more of a network equipment latency, one or more CPU usages, one or more disk usages, processes running on one or more servers in the network, network traffic and application specific data.

8. A system comprising:
memory configured to store computer-readable instructions therein; and
one or more processors configured to execute the computer-readable instructions to perform functions of:
receiving an inquiry to determine a root cause of a network problem; and
performing a multi-level process to determine the root cause, wherein
a first level of the multi-level process includes,
collecting data from one or more network components;
generating a set of system metrics, each system metric of the set representing a portion of the data, at least one system metric of the set being a target metric corresponding to the network problem;
ranking the set of system metrics based on a level of correlation of each system metric to the network problem to yield a ranked set of system metrics; and
providing a visual representation of the network problem and each of the ranked set of system metrics; and
a second level of the multi-level process includes,
receiving an input from identifying one or more of the highest ranked system metrics of the set of system metrics to be excluded from analysis; and
performing a conditional analysis for determining the root cause of the network problem using only ones of the set of system metrics that are not identified for exclusion.

9. The system of claim 8, wherein the system is a network analytics platform.

10. The system of claim 8, wherein the one or more processors are configured to execute the computer-readable instructions to further perform the functions of:
presenting a result of the conditional analysis;
receiving a further feedback identifying one of the set of metrics as the root cause of the network problem from among ones of the set of system metrics presented as part of the result of the conditional analysis; and
presenting a recommendation for addressing the network problem.

11. The system of claim 8, wherein the one or more processors are configured to execute the computer-readable instructions to perform the function of generating the set of system metrics by:
grouping the data into one or more sets;
analyzing the one or more sets to identify one or more common characteristics between two or more of the sets; and
combining the two or more sets into a single system metric of the set of system metrics.

12. The system of claim 11, wherein the one or more processors are configured to execute the computer-readable instructions to further perform the function of:
tagging each system metric of the set, the tag being an identifier of underlying data being represented in each system metric.

13. The system of claim 8, wherein each system metric of the set is a time series representation of corresponding data in the same set.

14. The system of claim 8, wherein the data in each of the set of system metrics include one or more of a network equipment latency, one or more CPU usages, one or more disk usages, processes running on one or more servers in the network, network traffic and application specific data.

15. One or more non-transitory computer-readable medium having computer-readable instructions stored therein, which when executed by one or more processors configure the one or more processors to perform functions of:
receiving an inquiry to determine a root cause of a network problem;
perform a multi-level process in order to:
present a ranked list of a set of system metrics that are correlated to the network problem, the ranked list being presented in accordance with a level of corresponding relevance to the network problem;
receive an input identifying one or more of the highest ranked system metrics of the ranked list of system metrics to be excluded from further analysis of the root cause of the network problem;
perform a conditional analysis of the network problem using only ones of the ranked list of the set of system metrics not identified for exclusion in the input; and
present a result of the conditional analysis.

16. The one or more non-transitory computer-readable medium of claim 15, wherein the multi-level process includes:
receive further input after presenting the result of the conditional analysis indicating one or more additional system metrics to be excluded from the analysis of the network problem; and
repeat the conditional analysis based on the further input; and
present the result of the conditional analysis performed based on the further input.

17. The one or more non-transitory computer-readable medium of claim 15, wherein the step of presenting the ranked list of system metrics includes:
collecting data from one or more network components;
generating the set of system metrics, each system metric of the set representing a portion of the data, at least one system metric of the set being a target metric corresponding to the network problem; and
ranking the set of system metrics based on a level of correlation of each system metric to the network problem to yield a ranked set of system metrics.

18. The one or more non-transitory computer-readable medium of claim 17, wherein the step of generating the set of system metrics includes:
grouping the data into one or more sets;
analyzing the one or more sets to identify one or more common characteristics between two or more of the sets;
combining the two or more sets into a single system metric of the set of system metrics; and
tagging each system metric of the set, the tag being an identifier of underlying data being represented in each system metric.

19. The one or more non-transitory computer-readable medium of claim 15, wherein data in each of the set of system metrics include one or more of a network equipment latency, one or more CPU usages, one or more disk usages, processes running on one or more servers in the network, network traffic and application specific data.

20. The one or more non-transitory computer-readable medium of claim 15, wherein each of the set of system metrics is presented as a time-series representation of the corresponding system metric.

\* \* \* \* \*